United States Patent
Mistry et al.

(10) Patent No.: US 9,569,001 B2
(45) Date of Patent: Feb. 14, 2017

(54) WEARABLE GESTURAL INTERFACE

(75) Inventors: Pranav Mistry, Cambridge, MA (US);
Patricia Maes, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 697 days.

(21) Appl. No.: 12/699,803

(22) Filed: Feb. 3, 2010

(65) Prior Publication Data

US 2010/0199232 A1 Aug. 5, 2010

Related U.S. Application Data

(60) Provisional application No. 61/149,636, filed on Feb. 3, 2009.

(51) Int. Cl.
| | |
|---|---|
| *G06F 3/01* | (2006.01) |
| *G06F 3/042* | (2006.01) |
| *H04M 1/02* | (2006.01) |
| *H04L 29/08* | (2006.01) |
| *G06F 1/16* | (2006.01) |
| *G06F 17/30* | (2006.01) |

(52) U.S. Cl.
CPC ............ *G06F 3/017* (2013.01); *G06F 1/163* (2013.01); *G06F 1/1639* (2013.01); *G06F 1/1673* (2013.01); *G06F 3/0425* (2013.01); *G06F 3/0426* (2013.01); *G06F 1/1696* (2013.01); *G06F 17/30879* (2013.01); *H04L 67/32* (2013.01); *H04M 1/0264* (2013.01); *H04M 1/0272* (2013.01)

(58) Field of Classification Search
CPC .. G06F 3/017; G06F 17/30879; G06F 1/1639; G06F 1/1686; G06F 3/0425; H04L 67/32; H04M 1/0264; H04M 1/0272
USPC .................................................. 715/863, 718
See application file for complete search history.

(56) References Cited

U.S. PATENT DOCUMENTS

| | | | | | |
|---|---|---|---|---|---|
| 4,328,917 | A | * | 5/1982 | Reeberg ......................... | 224/254 |
| 5,870,220 | A | * | 2/1999 | Migdal et al. ............. | 359/216.1 |
| 5,982,352 | A | * | 11/1999 | Pryor ............................ | 345/156 |
| 6,008,800 | A | * | 12/1999 | Pryor ............................ | 345/173 |

(Continued)

OTHER PUBLICATIONS

Luminvision Interactive Projection Systems, Luminvision LTD, 2008.*

(Continued)

*Primary Examiner* — Jeffrey A Gaffin
*Assistant Examiner* — John M Heffington
(74) *Attorney, Agent, or Firm* — Stephen R. Otis

(57) ABSTRACT

This invention may be implemented as a wearable apparatus comprised of a camera, a projector, a mirror, a microphone and a digital computer. The camera captures visual data. This data is analyzed by the digital computer to recognize objects and hand gestures, using color tracking and edge detection techniques. The projector is used, along with a mirror to adjust the direction of the projected light, to project images on objects in the user's environment. For example, the images may be projected on surfaces such as a wall, table, or piece of paper. The projected images may contain information relevant to the object being augmented. Indeed, the information may include current data obtained from the Internet. Also, the projected images may comprise graphical interfaces, with which a user may interact by making hand gestures.

14 Claims, 30 Drawing Sheets

(56) References Cited

U.S. PATENT DOCUMENTS

| | | | |
|---|---|---|---|
| 6,141,046 A * | 10/2000 | Roth et al. | 348/251 |
| 6,222,465 B1 | 4/2001 | Kumar et al. | |
| 6,431,711 B1 | 8/2002 | Pinhanez | |
| 6,982,697 B2 | 1/2006 | Wilson et al. | |
| 7,098,891 B1 * | 8/2006 | Pryor | 345/158 |
| 7,134,080 B2 | 11/2006 | Kjeldsen et al. | |
| 7,170,492 B2 | 1/2007 | Bell | |
| 7,348,963 B2 | 3/2008 | Bell | |
| 7,365,793 B2 * | 4/2008 | Cheatle et al. | 348/373 |
| 7,598,942 B2 | 10/2009 | Underkoffler et al. | |
| 7,633,527 B2 * | 12/2009 | Pilu | 348/211.4 |
| 7,667,129 B2 * | 2/2010 | Chidlaw et al. | 84/723 |
| 7,714,849 B2 * | 5/2010 | Pryor | 345/173 |
| 7,775,883 B2 * | 8/2010 | Smoot et al. | 463/36 |
| 7,804,492 B2 * | 9/2010 | Chang | 345/173 |
| 7,839,291 B1 * | 11/2010 | Richards | 340/573.6 |
| 7,878,664 B2 * | 2/2011 | Chan et al. | 353/98 |
| 7,891,826 B2 * | 2/2011 | Fujinawa et al. | 353/119 |
| 7,970,211 B2 * | 6/2011 | Wilson et al. | 382/190 |
| 7,973,773 B2 * | 7/2011 | Pryor | 345/173 |
| 8,013,843 B2 * | 9/2011 | Pryor | 345/173 |
| 8,044,941 B2 * | 10/2011 | Pryor | 345/173 |
| 8,068,100 B2 * | 11/2011 | Pryor | 345/173 |
| 8,072,440 B2 * | 12/2011 | Pryor | 345/173 |
| 8,147,066 B2 * | 4/2012 | Nozaki et al. | 353/30 |
| 8,427,511 B2 * | 4/2013 | Shin et al. | 345/661 |
| 2002/0057915 A1 * | 5/2002 | Mann | 396/661 |
| 2002/0105620 A1 * | 8/2002 | Goulden et al. | 353/30 |
| 2002/0130862 A1 * | 9/2002 | Lee et al. | 345/420 |
| 2003/0184575 A1 * | 10/2003 | Reho et al. | 345/714 |
| 2004/0102247 A1 * | 5/2004 | Smoot et al. | 463/36 |
| 2004/0155968 A1 * | 8/2004 | Cheatle et al. | 348/207.99 |
| 2005/0088407 A1 * | 4/2005 | Bell et al. | 345/156 |
| 2006/0001543 A1 * | 1/2006 | Raskar et al. | 340/572.1 |
| 2006/0251334 A1 * | 11/2006 | Oba et al. | 382/275 |
| 2006/0262188 A1 * | 11/2006 | Elyada et al. | 348/143 |
| 2006/0267963 A1 * | 11/2006 | Pryor | 345/173 |
| 2007/0033539 A1 * | 2/2007 | Thielman et al. | 715/769 |
| 2007/0035563 A1 | 2/2007 | Biocca et al. | |
| 2007/0159321 A1 * | 7/2007 | Ogata et al. | 340/539.12 |
| 2007/0169615 A1 * | 7/2007 | Chidlaw et al. | 84/723 |
| 2007/0201863 A1 * | 8/2007 | Wilson et al. | 396/429 |
| 2008/0018591 A1 * | 1/2008 | Pittel et al. | 345/156 |
| 2008/0129704 A1 * | 6/2008 | Pryor | 345/173 |
| 2008/0136679 A1 * | 6/2008 | Newman et al. | 341/20 |
| 2008/0229198 A1 * | 9/2008 | Jung et al. | 715/708 |
| 2008/0267504 A1 * | 10/2008 | Schloter | G06F 17/30879 382/181 |
| 2009/0096994 A1 * | 4/2009 | Smits | 353/30 |
| 2009/0231278 A1 | 9/2009 | St. Hilaire et al. | |
| 2009/0235295 A1 * | 9/2009 | Bell et al. | 725/9 |
| 2009/0278915 A1 | 11/2009 | Kramer et al. | |
| 2010/0066675 A1 * | 3/2010 | Wilson et al. | 345/158 |
| 2010/0095121 A1 * | 4/2010 | Shetty | H04L 9/3242 713/170 |
| 2010/0110264 A1 * | 5/2010 | Carroll | 348/333.01 |
| 2010/0188340 A1 * | 7/2010 | Smoot | 345/173 |
| 2010/0198200 A1 * | 8/2010 | Horvath | 606/10 |
| 2010/0209007 A1 * | 8/2010 | Elyada et al. | 382/218 |
| 2010/0231505 A1 * | 9/2010 | Iwata | 345/156 |
| 2011/0018830 A1 * | 1/2011 | Pryor | 345/173 |
| 2011/0032089 A1 * | 2/2011 | Pryor | 340/407.1 |
| 2011/0032204 A1 * | 2/2011 | Pryor | 345/173 |
| 2011/0074724 A1 * | 3/2011 | Pryor | 345/173 |
| 2011/0254832 A1 * | 10/2011 | Wilson et al. | 345/418 |
| 2012/0218181 A1 * | 8/2012 | Pryor | 345/156 |

OTHER PUBLICATIONS

Ask Search, http://www.ask.com/web?qsrc=1&o=0&l=dir&q=+mall+projector+ball+game+floor.*

Ask Search, http://www.ask.com/web?qsrc=1&o=0&l=dir&q=interactive+floor+projection+system.*

A. Hang, E. Rukzio, A. Greaves, Projector Phone: A Study of Using Mobile Phones with Integrated Projector for Interaction with Maps, Mobile HCI 2008, Proceedings of the 10th International Conference on Human Computer Interaction with Mobile Devices and Services, pp. 207-216, ACM, New York, NY USA, 2008.

T. Karitsuka, K. Sato, A Wearable Mixed Reality with an On-Board Projector, ISMAR 2003, Proceedings of the 2nd IEEE/ACM International Symposium on Mixed and Augmented Reality, p. 321, IEEE Computer Society, Washington, DC, USA, 2003.

S. Mann, Telepointer: Hands-Free Completely Self-Contained Wearable Visual Augmented Reality Without Headwear and Without Any Infrastructural Reliance, ISWC 2000, Proceedings of the 4th IEEE International Symposium on Wearable Computers, p. 177, IEEE Computer Society, Washington, DC, USA, 2000.

C. Metzger, T. Starner, M. Anderson, FreeDigiter: A Contact-free Device for Gesture Control, ISWC 2004, Proceedings of the 8th International Symposium on Wearable Computers, pp. 18-21, IEEE Computer Society, Washington, DC, USA, 2004.

C. Pinhanez, Creating Ubiquitous Interactive Games Using Everywhere Displays Projectors, Proceedings of the International Workshop in Entertainment Computing (IWEC 2002), Makuhari, Japan, May 14-17, 2002.

C. Pinhanez, The Everywhere Displays Projector: A Device to Create Ubiquitous Graphical Interfaces, Ubicomp 2001, Proceedings of the 3rd International Conference on Ubiquitous Computing, pp. 315-331, Springer-Verlag, London, UK, 2001.

R. Raskar, J. Van Baar, P. Beardsley, T. Willwacher, S. Rao, C. Forlines, iLamps: Geometrically Aware and Self-Configuring Projectors, Siggraph 2005 ACM Siggraph 2005 Courses, Article No. 5, ACM, New York, NY, USA 2005.

T. Starner, J. Auxier, D. Ashbrook, M. Gandy, The Gesture Pendant: A Self-Illuminating, Wearable, Infrared Computer Vision System for Home Automation Control and Medical Monitoring, ISWC 2000, Proceedings of the 4th IEEE International Symposium on Wearable Computers, p. 87, IEEE Computer Society, Washington, DC, USA, 2000.

N. Ukita, A. Terabe, Y. Kono, M. Kidode, Wearable Virtual Tablet: Fingertip Drawing on Portable Plane-object using an Active-Infrared Camera, IUI 2004, Proceedings of the 9th International Conference on Intelligent User Interfaces, pp. 169-176, ACM, New York, NY, USA, 2004.

P. Wellner, Interacting with Paper on the DigitalDesk, Communications of the ACM—Special Issue on Augmented Environments: back to the Real World, vol. 36, Issue 7, Jul. 1993, pp. 87-96, ACM, New York, NY, USA 1993.

A. Wilson, PlayAnywhere: A Compact Interactive Tabletop Projection-Vision System, UIST 2005, Proceedings of the 18th Annual ACM Symposium on User Interface Software and Technology, pp. 83-92, ACM, New York, New York, USA, 2005.

A. Wilson, Touchlight: An Imaging Touch Screen and Display for Gesture-Based Interaction, Siggraph 2005 ACM Siggraph 2005 Emerging Technologies, Article No. 25, ACM, New York, New York, USA 2005.

Mann, S. Telepointer: Hands-Free Completely Self Contained Wearable Visual Augmented Reality without Headwear and without any Infrastructural Reliance. In ISWC '00 Proceedings of the 4th IEEE International Symposium on Wearable Computers, p. 177, IEEE Computer Society Washington, DC, USA, 2000.

* cited by examiner

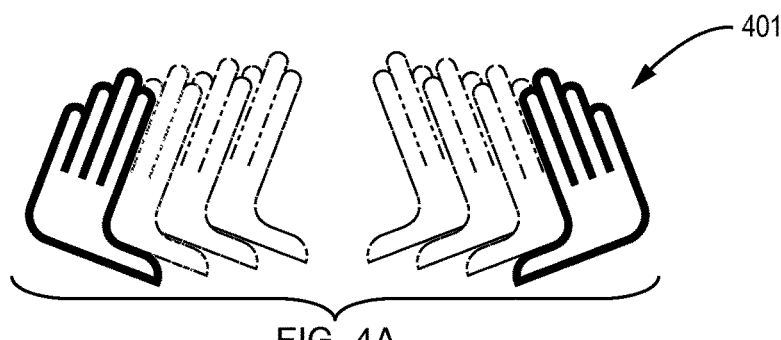
FIG. 4A
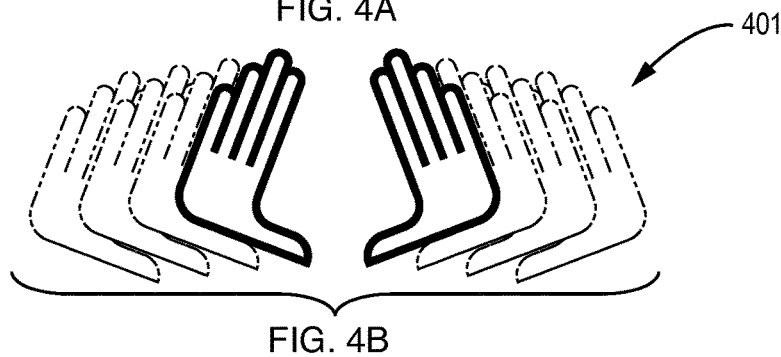
FIG. 4B
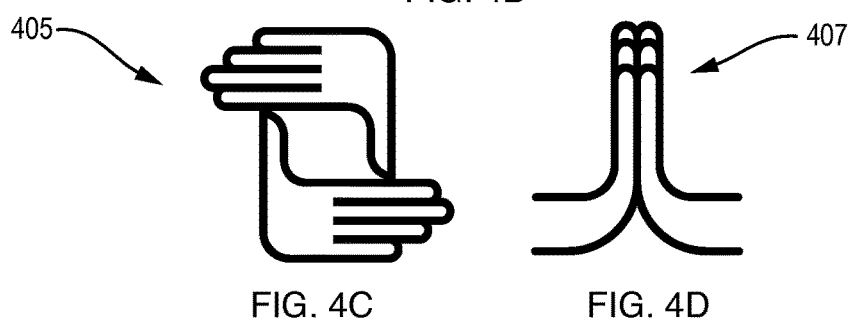
FIG. 4C　　　FIG. 4D
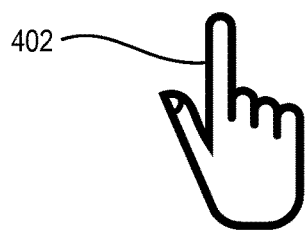　　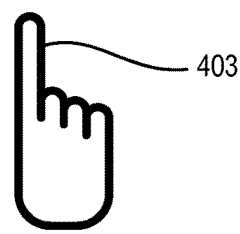
FIG. 4E　　　FIG. 4F
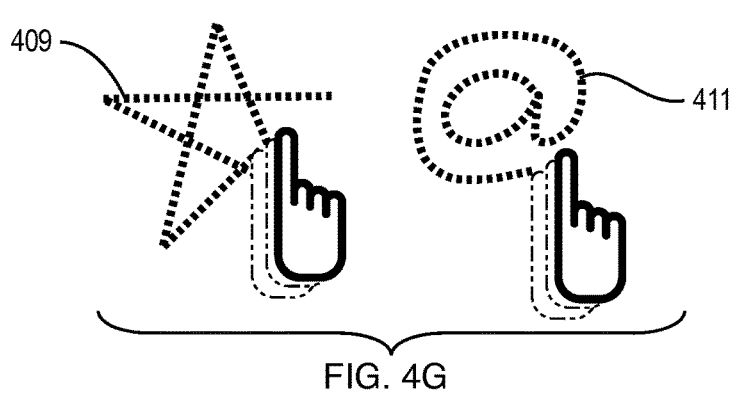
FIG. 4G

WEARABLE GESTURAL INTERFACE

RELATED APPLICATIONS

This application claims the benefit of U.S. Provisional Application Ser. No. 61/149,636, filed Feb. 3, 2009.

FIELD OF THE TECHNOLOGY

The present invention relates, in general, to object augmentation and gestural interfaces.

COMPUTER PROGRAM LISTING

The ASCII text file named Sixthsense.txt, created Feb. 1, 2010, with a size of 114,878 bytes (the "Source Code"), comprises a computer program listing for an exemplary implementation of this invention. That ASCII text file is incorporated by reference herein.

SUMMARY

Conventional augmented reality systems superimpose information on views of the physical world, or on the physical world itself.

It would be highly desirable for an augmented reality (AR) system to be wearable, and to enable a user to project information on any surface in the user's environment. For example, if a user is looking at a book in a bookstore, it would desirable if the AR system could project information about that book on the book itself. Such information might be an image of four stars, indicating a favorable book review. Also, it would be highly desirable if an AR system could recognize hand gestures, and thereby enable a user to interact with the projected information. For example, it would be desirable if a user could use hand gestures to interact with a map projected on a wall, in order to zoom in or zoom out. Such a wearable, lightweight AR system, with the ability to project data on ordinary surfaces and the ability to recognize hand gestures, would give a user great freedom. The user would no longer be constrained to obtain information from a screen, but could instead cause it to be projected on objects around him. Likewise, instead of being limited to inputting data with keyboards, mice or touch-based interaction screens, a user could use hand gestures, done freely in the air, to interact with the projected information.

In exemplary implementations of this invention, these desired goals are achieved. In these exemplary implementations, the invention is a wearable apparatus comprised of a camera, a projector, a mirror, a microphone, and a digital computer. The camera captures visual data. This data is analyzed by the digital computer to recognize objects and hand gestures, using color tracking and edge detection techniques. The projector is used, along with a mirror to adjust the direction of the projected light, to project images on objects in the user's environment. For example, the images may be projected on surfaces such as a wall, table, or piece of paper.

In exemplary implementations of the invention, relevant information is projected on objects as follows: Visual data captured by a camera is analyzed to recognize objects. Using a wireless connection, relevant information regarding the identified object is obtained from the Internet, and this information is projected on the identified object. Here are three examples, among others: First, a user may hold a boarding pass for an airplane flight in her hand. Current information about whether the flight is on time or delayed may be obtained from the Internet, and then projected on the boarding pass. Second, a user could hold a newspaper with a weather map printed on it. Visual data captured by the camera may be analyzed to recognize the weather map. Once the weather map is recognized, information updating the weather forecast may be obtained from the Internet, and then projected on the physical map on the newspaper page. Third, a user could be in a supermarket, and pick up a food product. In that case, information about the product may be obtained from the Internet, and then projected on the product's container. The nature of the information displayed may vary, depending on user's preferences. Among other things, the displayed information may relate to the food's calories, allergens or cost.

In exemplary implementations of the invention, the information that is projected may be comprised of either still images or dynamic video images. For example, in the case of the weather map discussed earlier, the updated data that is projected may be comprised of still images, such as numerals representing current temperature readings. Or, instead, a video of a weatherperson speaking may be projected on the map. Similarly, for example, a user may hold a newspaper with a headline on it. The visual data captured by the camera may be analyzed to recognize the headline, and a video news story updating the headline may be downloaded from the Internet. This dynamic video may then be projected on the newspaper.

In exemplary implementations of the invention, visual data captured by a camera may be analyzed by a digital computer, in order to recognize hand gestures or finger movements. A user may make such gestures or movements in order to give instructions or input information. Here are four examples: First, a user may draw a circle on her wrist, thereby giving an instruction for an image of an analog watch to be projected on her wrist. Second, a user may draw a circle at a location other than on a wrist, in order to indicate that the user is selecting the projected image that is circled. Third, a user may draw an '@' symbol in the air with his index finger, thereby giving an instruction to select an email application. Fourth, an image of the dial pad of a phone may be projected on the palm of a user's hand, and a user may, with the fingers of his other hand, type on the keys of this projected dial pad in order to dial a number.

In exemplary implementations of this invention, a user may make hand gestures or finger movements in the air, without touching anything, and use these gestures or movements to interact with images that are projected on a surface. These projected images may convey information or comprise a graphical user interface. Here are two examples: First, a user may draw a line or shape in the air with his index finger. Visual data captured by a camera may be analyzed to track this drawing motion, and the line or shape that is so drawn may be projected on a surface such as a wall. Second, a photograph may be projected on a surface, and a user may then edit this photograph by making hand gestures in the air.

Alternatively, a user may make gestures while touching a surface, to interact with a graphical user interface projected on a surface. The effect is to emulate a touchscreen.

In exemplary implementations of this invention, touch gestures may be detected using both audio data captured by a microphone and video data captured by a camera. For example, in exemplary implementations of this invention, a microphone may be clipped to a blank sheet of paper. The microphone may detect the sound of a user's finger touching the paper. This audio data gives a precise indication of the time that the touch event occurs. Based on this audio data, and on visual data captured by the camera, the time and trajectory of touch events may be determined. Here are two examples, among others. First, a user may make drawing motions on the blank sheet of paper with her index finger, and the resulting drawing may be projected on that sheet of paper. Second, an image of a web browser may be projected on a blank sheet of paper, and a user may interact with it by making gestures with his finger while his finger is in contact with the sheet of paper.

In exemplary implementations of the invention, information may also be presented in audio form. For example, if the digital computer analyzes the visual data captured by the camera and recognizes a book, then an audio recording of a relevant book review may be obtained from the Internet, and played to the user on a headset. Or, for example, when a user is meeting another person, visual data captured by the camera may be analyzed in order to determine the other person's identity. Once that person's identity is determined, an audio recording with information about that person may be obtained from the Internet, and then played in the user's ear.

In exemplary implementations of the invention, a user may instruct the camera to take a photograph, by making a framing gesture with her hands. The pictures, once taken, may be stored in the computer's memory.

In exemplary implementations of the invention, a user may use hand gestures to browse through information that has been projected on a surface. For example, a set of stored photographs may be projected, and a user may browse through the projected photos by making hand gestures.

In exemplary implementations of the invention, a user may interact with information that is projected on an object, by interacting with the object itself. For example, a video game of a car racing on a track may be projected on a piece of paper. A user may hold the paper, and control the car by changing the position of the paper. For example, tilting the paper forward accelerates the car and tilting the car backward slows it down. Tilting the paper to the right makes the car steer right, and the tilting to the left makes the car steer left. This video game may be enhanced with sound effects, such as an engine revving or other race track sounds. The user may listen to these sound effects with headphones.

In exemplary implementations of the invention, a user may make motions with a body part other than a hand or finger, in order to interact with a projected image. For example, an image of a ball may be projected on a floor, and users may kick the projected ball by moving their physical feet.

In exemplary implementations of the invention, an image on one surface may be copied, and then projected or displayed on another surface. For example, a user may make a certain hand gesture, as an instruction to copy a portion of a page of a physical book and to project the copy on a sheet of paper. The digital computer may analyze the visual data captured by the camera, and based on such analysis, recognize this instruction and the portion of the page to be copied. The projector may then project this copy on the sheet of paper. Alternately, a user may make hand gestures, as instructions to copy an image from one surface and cause it to be displayed on a computer screen, or vice versa.

Advantageously, in exemplary implementations of this invention, the projected images are automatically corrected for distortions caused by factors such as the tilt or movement of the surface on which the projection is being made. Based on video data captured by the camera, the computer outputs instructions to the projector to adjust the projection to revise the image. For example, the alignment, tilt, position or scale of the projected image may be corrected.

This invention may be implemented with different types of computers. For example, the computer may be a laptop, smart phone, cell phone, netbook, tablet or other mobile computing device.

It is helpful to compare the present invention to prior augmented reality (AR) technology.

Many conventional AR devices superimpose information not on the physical object itself, but instead on a picture of that physical object, which picture is displayed on a screen. For example, in televised games of American football, "first down" lines are often superimposed on video images of the physical playing field. Likewise, some mobile phone applications allow information to be superimposed on a live video stream playing on the cell phone's screen. A drawback of this conventional approach is that a user is limited to obtaining information from a screen.

Convention helmet mounted displays (HMDs) likewise do not project information on the physical object, but rather display it on a helmet visor, through which the user is viewing the object. This approach is appropriate in combat aircraft, where HMDs are often deployed. After all, it would be impractical to project information about an enemy jet directly on the enemy jet itself. But helmets are not convenient for day-to-day ordinary civilian life. Thus, a drawback of conventional HMDs is that the user is constrained to obtaining the information from a helmet visor.

In contrast, exemplary implementations of the present invention allow information to be projected directly on images to which they relate. This gives the user freedom, because he or she is no longer tied to a computer screen or visor in order to be able to gather the information. Instead, the objects themselves are augmented with information projected on them.

The Everywhere Displays™ projector (EDP) is an existing technology that projects information on surfaces, similar to the present invention. EDP is described in U.S. Pat. No. 6,431,711 and also in Pinhanez, C., The Everywhere Displays Projector: A Device To Create Ubiquitous Graphical Interfaces, Proc. of Ubiquitous Computing 2001, Atlanta, Ga. EDP uses a rotating mirror to steer light from a fixed liquid crystal display (LCD) projector on different surfaces of an environment and a pan/tilt camera to detect interaction with the projected surface. However, the present invention is different—and better—than EDP in at least three respects. First, EDP is a fixed system, installed in a particular room or environment. In contrast, the present invention may be implemented as a wearable, truly mobile apparatus that is not limited to a particular location. Second, EDP uses only touch-based interaction, whereas the present invention may be implemented in such a manner as to allow interaction with free-hand gestures. Third, EDP does not augment objects with real-time information, whereas the present invention may be implemented in such a manner as to do so.

It is also helpful to compare the present invention to prior gesture recognition technology.

Multi-touch devices—such as those found in many mobile devices and some tabletop applications—are a widely adopted gesture recognition technology. They detect gestures made while touching a screen. Commonly, these devices include screens with affixed sensors, such as embedded capacitive sensors, or cameras located behind or at the periphery of the screen. However, the present invention has at least two advantages over these multi-touch devices. First, conventional multi-touch devices are limited to touch-based interaction, whereas the present invention may be implemented in such a manner as to permit interaction using free-hand gestures made in the air, while not touching a screen. Second, conventional multi-touch devices do not project information on physical objects in the user's environment, whereas the present invention does.

The Gesture Pendant™ (GP) is a gesture recognition device that may be worn around the neck. It is described in Starner, T. et al., The Gesture Pendant: A Self-Illuminating, Wearable, Infrared Computer Vision System for Home Automation Control and Medical Monitoring, Proc. of ISWC, 2000. GP is basically an input device that recognizes a user's hand gestures to control a home automation device or medical monitoring device. The present invention is different—and better than—GP in at least two ways. First, GP is only an input device; whereas the present invention may be implemented in such a way as to augment objects by projecting real time, relevant information on them. Second, the present invention may be implemented in such a manner as to allow a person to interact with projected graphical information. In contrast, GP does not have a projector at all, so it does not support interaction with projected information.

The G-speak® system, developed by Oblong Industries, Inc., is a gesture recognition system that uses infra-red (IR) tracking. It floods a room with IR light and captures video data with many high resolution IR cameras. Like the present invention, it allows a user to interact with projected information by making hand gestures and other body movements. However, the present invention has at least two advantages over G-speak®. First, G-speak® is a fixed system, with multiple cameras and multiple projectors installed in a particular room or environment. It also has fixed projection surfaces. In contrast, the present invention may be implemented in such a manner that a user may wear it as he moves about, augmenting the world around him by converting any surface into an interactive surface. Second, the G-speak® system uses IR light, and requires high resolution IR cameras. In contrast, the present invention may be implemented in such a way as to use visible light, with a low-resolution camera.

A wearable mixed reality (WMR) system is described in T. Karitsuka and K. Sato, A Wearable Mixed Reality with an On-board Projector, Proc. ISMAR 2003. The WMR is a wearable system that projects visible graphics on a dedicated display surface. It determines the 2D position of the display surface by irradiating the surface with IR light and capturing IR light that is reflected from retro-reflectors attached to the surface. A user may interact with the projected graphics by moving a finger. The WMR tracks the moving finger by detecting IR light emitted by an IR-LED, which is housed in a finger cap worn on that finger. The present invention has several advantages over the WMR. First, the WMR is limited to a dedicated display surface, whereas the present invention may project onto any surface. Also, the WMR does not do image matching to recognize objects in a user's hand, unlike the present invention. Third, the WMR permits only single-finger gestures, whereas the present invention recognizes freehand gestures.

This invention may be implemented as apparatus adapted for being worn by a person, which apparatus comprises: (a) a camera, (b) a projector for projecting images on at least one surface, which surface is not part of said apparatus and is not dedicated for display of said images, and (c) a digital computer for: (I) analyzing visual data captured by said camera to recognize objects and track their motion, and (II) outputting instructions to change said projected images, in such a way that said changes depend at least in part on the results of said analysis. Furthermore: (1) said computer may be adapted for analyzing said visual data to identify gestures; (2) said computer may be adapted for outputting instructions for the projection of a graphical user interface on at least one said surface, and analyzing said visual data to recognize movements or gestures that interact with said interface, (3) said apparatus may be part of, or adapted for being supported by, an object worn around a neck, (4) said computer may be adapted for analyzing said visual data to detect movements of a finger or other object, and further adapted for outputting instructions for projecting images that depict lines or other shapes corresponding to said movements, (5) said computer may be adapted for analyzing audio data detected by a microphone to identify sounds indicative of the time at which a finger or other object makes contact with a surface This invention may be implemented as apparatus which is adapted for being worn by a person, and which comprises: (a) a camera, (b) a projector for projecting images on at least one surface, which surface is separate from said apparatus and is not dedicated to video display, (c) a transceiver for connecting to a network of computers, and (d) a digital computer for: (I) analyzing video data captured by said camera to identify objects, and (II) based at least in part on said analysis, outputting instructions to obtain information from said global network, processing data indicative of said obtained information after it is received, and outputting instructions to alter said projected images, in a way that said alteration depends at least in part on said obtained information. Furthermore: (1) said projector may be adapted for projecting images which convey said obtained information, (2) said computer may be adapted for outputting signals indicative of the audio output of a transducer, in such a way that said audio output conveys said obtained information, (3) said projector may be adapted for projecting images on a surface of a product or of said product's packaging, which images convey information so obtained that relates to said product, (4) said projector may be adapted for projecting images on a surface that has printed text or graphics on it, which images convey information so obtained that relates to said printed text or graphics, (5) said computer may be adapted for analyzing said visual data to determine the identity of a person or other object, and further adapted for outputting instructions for obtaining information from said network regarding said identified person or other object, and further adapted for outputting instructions for altering the audio or visual output of a transducer in such a way as to convey said information, (6) said computer may be adapted for outputting instructions to project an image of a keyboard, dial pad or other graphical user interface, and further adapted for analyzing said visual data captured by said camera to detect movements comprising a user's interaction with said projected image, (7) said computer may be adapted for outputting instructions to project images that display a message obtained through said global network or that display a graphical user interface for a web browser.

This invention may be implemented as apparatus which is wearable and comprises: (a) a projector for projecting images on at least one surface, which surface is neither part of, nor connected to, said apparatus or any video device, and (b) a camera for (I) capturing visual data, and (II) outputting signals indicative of said visual data, for transmission to one or more digital processors adapted for analyzing visual data captured by said camera to identify gestures, and outputting instructions to change said projected images in such a way as to alter said projected images in response to said gestures. Furthermore: (1) at least one said digital processor may be adapted for analyzing said visual data to recognize at least one gesture, and in response to said gesture, outputting instructions to project unto a surface a visual pattern copied from another surface, (2) at least one said digital processor may be adapted for analyzing said visual data to identify at least one gesture indicative of a user's instruction to take a photograph, and further adapted for outputting instructions for said camera to take said photograph, (3) at least one said digital processor may be adapted for analyzing said visual data to identify a gesture indicative of a user's instruction to display an image of a watch, and further adapted for outputting instructions to project an image of a watch, (4) at least one said digital processor may be adapted for analyzing said visual data to detect changes in position of a body part of a user or of an object held by or affixed to a user, and further adapted for outputting instructions to alter said projected images in response to said changes in position, and (5) at least one said digital processor may be adapted for analyzing said visual data to recognize an object and for outputting instructions to project information on said object.

BRIEF DESCRIPTION OF THE DRAWINGS

The following detailed description of the invention refers to the accompanying drawings, wherein:

FIGS. 4A, 4B, 4C, 4D, 4E, 4F and 4G each, respectively, show a hand gesture recognized by an exemplary implementation of this invention.

DETAILED DESCRIPTION

Figure 1:
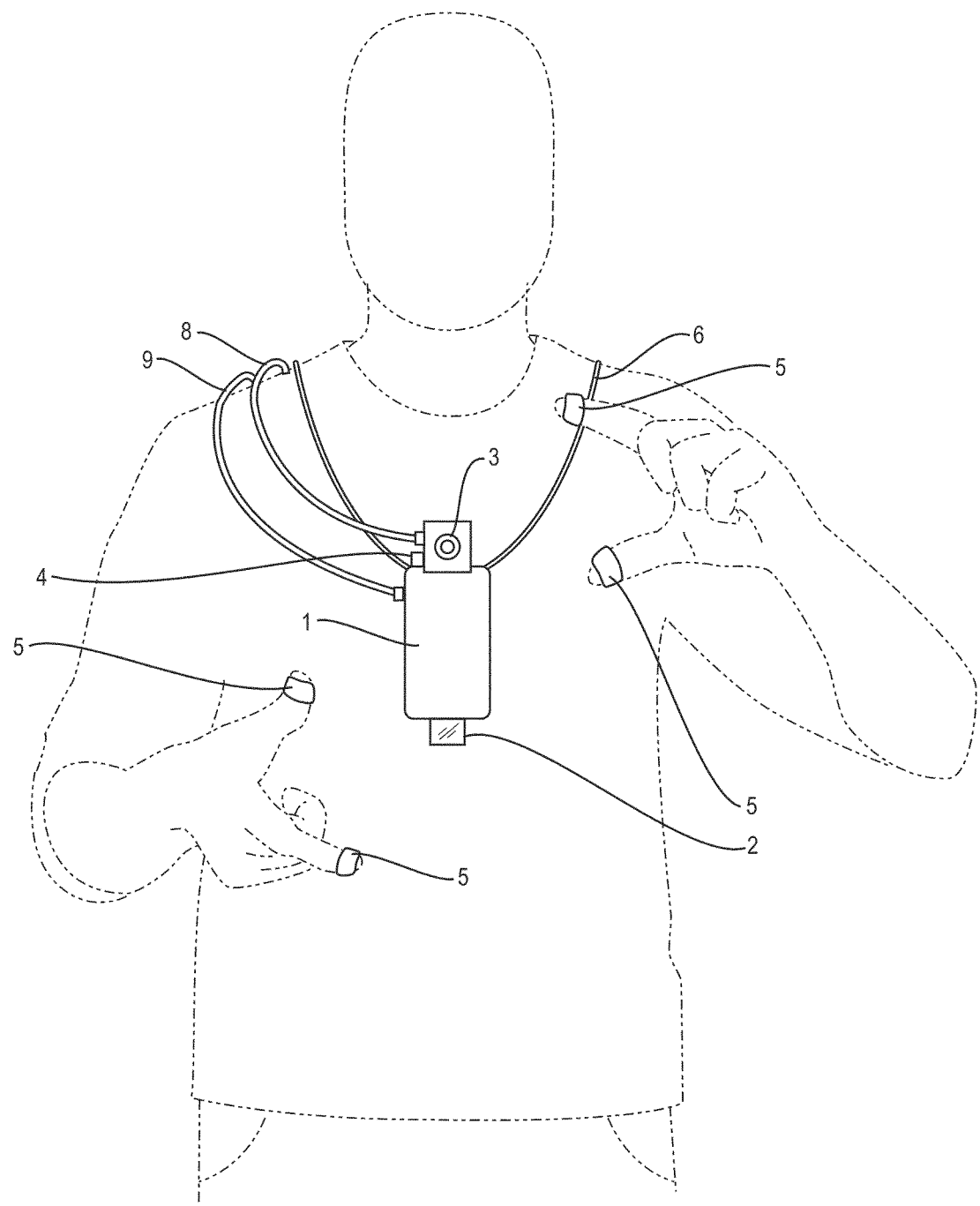
FIG. 1 is a front view of this invention, in an exemplary implementation of this invention.

FIG. 1 is a front view of a prototype of this invention. The prototype is adapted so that it may be worn by a user. In this prototype, a projector 1, mirror 2, camera 3, and microphone 4 are all part of a pendant unit that hangs from a support 6 worn around a user's neck. Color markers 5 may be attached to a user's thumbs and forefingers. Cables 8 and 9 provide electronic connections with a computer.

In the prototype shown in FIG. 1, the projector 1 is a Micro Professional Projector MPRO® 110, model 78-9236-7702-1 sold by 3M Company, St. Paul, Minn. This pico projector has a light emitting diode (LED) light source, liquid crystal on silicon (LCOS) chips, a projection distance of 305-1800 mm, an image size of 163 to 975 mm, a refresh rate of 60 Hz, a resolution of 640×480 pixels, and a video graphics array (VGA) port. Light weight is desirable for a wearable device. Advantageously, this projector weighs only 5.6 ounces.

In this prototype, the mirror 2 is a 1"×1" first surface mirror. An advantage of the first surface mirror is that it avoids ghosting effects that can occur with second surface mirrors. The mirror 2 is used to redirect light projected from the projector. In this prototype implementation, a user may manually adjust the angle of the mirror. For example, if a user wants the light to be projected on the floor, the user may manually adjust the tilt off the mirror so that the light is directed toward the floor.

In this prototype, the camera 3 is a Logitech® Quickcam® Pro for Notebooks™, part number 960-000045, sold by Logitech, Fremont, Calif. This 2 MP Notebook web camera takes color photographs, with video capture of 1600×1200 pixels @ 30 fps, still capture of 1600×1200 pixels, automatic focus, and a high-speed USB computer interface. Advantageously, this camera weighs only 0.5 pounds.

This Logitech® Quickcam® camera 3 comes with a built-in microphone. However, in the prototype shown in FIG. 1., the camera 3 has been modified by removing the microphone 4 from the camera's housing, attaching a cable to the microphone (to establish electronic connections between the microphone and the pendant unit) and attaching a clip to the microphone (to allow the microphone to be clipped to objects, such as a sheet of paper).

In this prototype, color tracking is used to follow the motion of a user's fingers. To facilitate this color tracking, a user may wear color markers 5 as visual fiducials on the tips of his or her fingers. In this prototype, the color markers are attached to only the thumbs and index fingers. Alternately, this invention may be implemented in such a manner that a user may wear color markers on up to all ten fingers. The color markers may be embodied in various ways. For example, a simple, inexpensive approach is to use tape or caps of whiteboard markers as the color markers.

In this prototype, a cable 8 provides electronic connections between the camera 3 and microphone 4, on the one hand, and a computer, on the other hand. Likewise, a cable 9 provides electronic connections between the projector 1 and a computer.

In this prototype, the computer is a Vaio® Z Series laptop computer, model VGN-Z880 G/B, sold by Sony Corporation of America (New York, N.Y.). The laptop has a 2.53 GHz Intel® Core 2 Duo processor, and a 128 GB hard drive. In this prototype, the Vaio® laptop has access to the Internet, using a 3G wireless connection.

Figure 2:
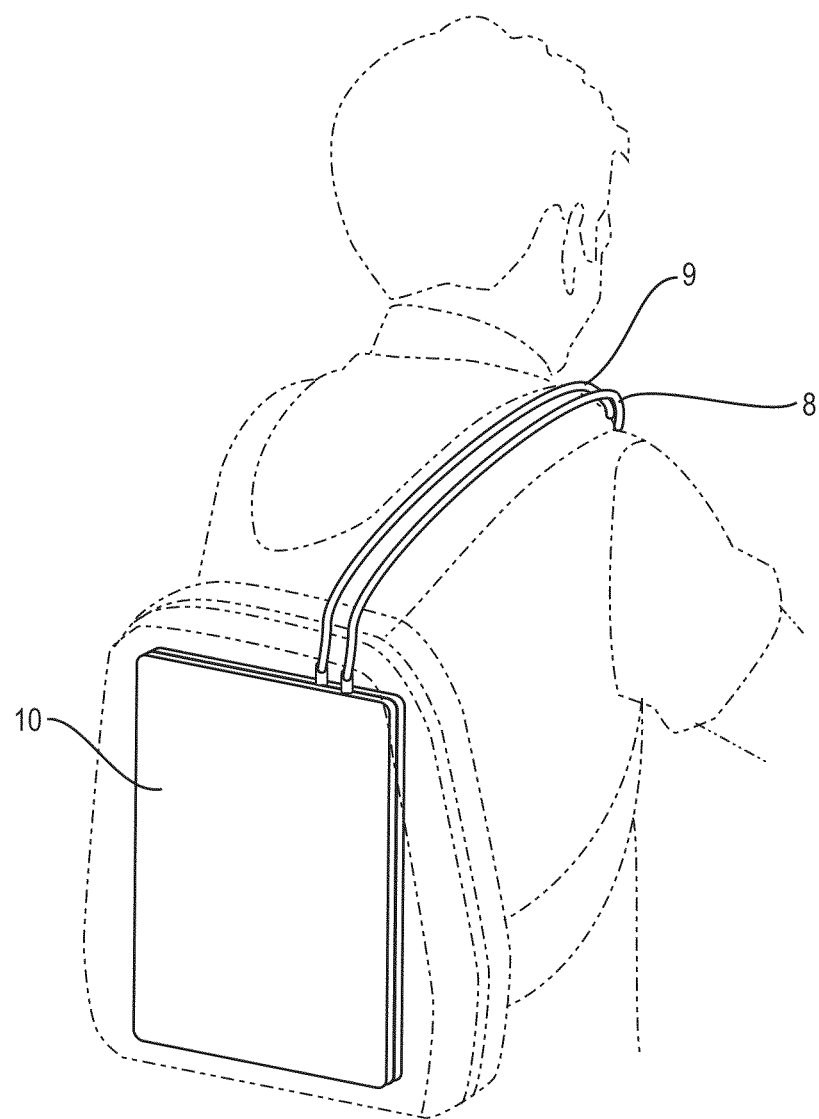
FIG. 2 shows a computer being carried in a user's backpack, in a prototype implementation of this invention.
Figure 3:
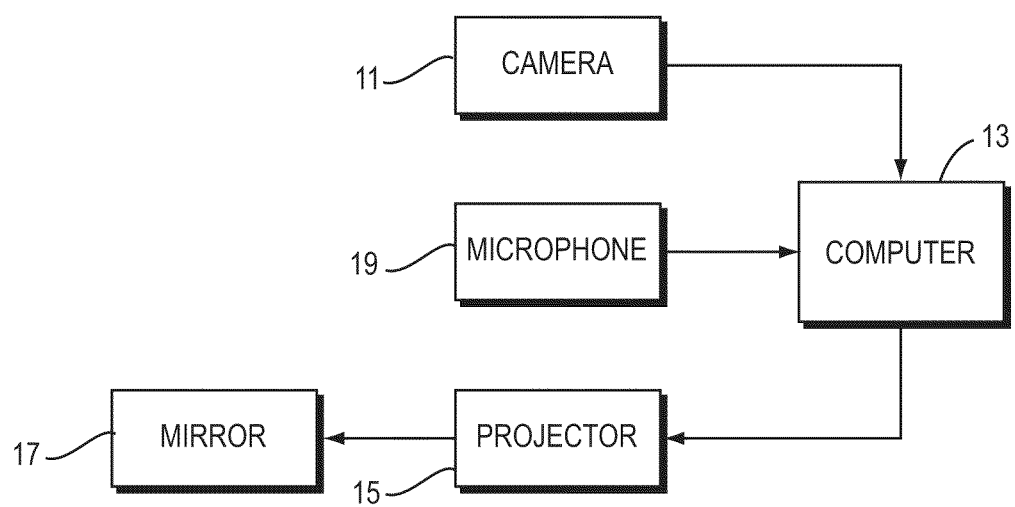
FIG. 3 is a diagram showing hardware components that comprise an exemplary implementation of this invention.

Due to its weight and size, this Vaio® laptop can not practicably be housed in the pendant unit. Instead, in this prototype, the user may carry this Vaio®laptop in a backpack. FIG. 2 illustrates a user carrying a computer 10 in a backpack. Cable 8 provides electronic connections between the computer 10 and the camera/microphone in the pendant unit. Cable 9 provides electronic connections between the computer 10 and the projector in the pendant unit. In alternate implementations, other computing devices may be used instead of the Vaio® laptop. For example, a smart phone or cell phone running on a Windows Mobile® or Android® mobile operating system may be used as the computer. Or, for example, a netbook, tablet or other mobile computing device may be used as the computer. In some cases, the computing device is sufficiently small and lightweight to be carried in a user's pocket. FIG. 3 shows how, in exemplary implementations of this invention, these components interrelate. A camera 11 captures a stream of video data of the scene in front of the user. This visual data is sent to a computer 13. The computer 13 employs software that comprises a vision engine and interface engine. The vision engine recognizes gestures, using color tracking to track the movement of color markers on the tips of a user's fingers. The vision engine also performs object recognition, by comparing an image of an object captured by the camera with a database of pre-stored images. In a prototype of this invention, a computer 13 accesses this data-base via the Internet. Also, the vision image may identify an object based on bar codes or fiducials printed on or affixed to the object. The interface engine provides the projector 15 with the images to be projected. It also accesses the Internet to find out information that is relevant to the application with which the user is interacting. For example, in the map application, a projector 15 may be projecting a map on a wall and a user may make a "zoom in" gesture (by moving pinched hands apart). In that case, the interface engine may access the Internet for map data needed to update (i.e., zoom in) the projected map, and then provide the projector with the updated map for projection. The interface engine updates the graphical interface on the basis of input from the vision engine.

The computer 13 may instruct the camera 11 to take a photograph.

A mirror 17 may be used to alter the direction of the light projected by the projector 15.

In this prototype, a user may use touch-based gestures to interact with a graphical interface projected on a surface (such as sheet of paper). To track these touch-based gestures, this prototype may employ both video data captured by a camera 11 and sound data captured by a microphone 19. The video data is used for color tracking However, the color tracking may not provide a sufficiently precise measure of when the touch-based gesture begins and ends. To solve this problem, the sound data may be analyzed to detect sounds made by the touch interaction. Thus, the microphone may used to advantage to provide a more precise measure of the timing of the touch-based gesture.

In exemplary implementations of this invention, the vision engine recognizes certain gestures made popular by interactive multi-touch based products such as Microsoft® Surface or Apple® iPhone®. Such gestures include zoom in, zoom out or pan a map or flip though documents or images using the movements of user's hand or index finger. For example, a user can zoom in or out by moving his hands/fingers 401 farther or nearer to each other, respectively, as shown in FIGS. 4A and 4B. Also, for example, a user can draw on any surfaces using the movement of the index finger 402 as if it were a pen, as shown in FIG. 4E. If the index finger 403 is extended and the tip of the thumb is hidden from the camera, as shown in FIG. 4F, the vision engine recognizes that the "pen" is down (not in use). In contrast, if the index finger is extended and the tip of the thumb is visible to the camera, the vision engine recognizes that the pen is "up" (in use).

In exemplary implementations of this invention, the vision engine also recognizes freehand gestures. One example is to touch both the index fingers with the opposing thumbs, forming a rectangle or framing gesture 405, as shown in FIG. 4C. This gesture activates the photo taking application, which lets a user take a photo of the scene in front of the user, without needing to physically click a camera. Another example of such freehand gestures is the namaste posture 407, as shown in FIG. 4D, that lets a user navigate to the home page (that is projected by the projector) from within any application.

In exemplary implementations of this invention, the vision engine also recognizes gestures made popular by stylus-based interfaces. If a user draws certain icons or symbols in the air with an index finger, the vision engine can recognize these as interaction instructions. For example, drawing a star 409 (shown in FIG. 4G) can launch the weather application. Drawing a magnifying glass symbol takes the user to the map application; and drawing an '@' symbol 411 (shown in FIG. 4G) lets the user check his mail. The user can undo an operation by moving his index finger forming an 'X' symbol.

Thus, in exemplary implementations of this invention, the vision engine may be used to advantage to recognize a wide range of gestures. A user may interact by using gestures that have already been popularized by multi-touch and stylus-based interfaces, or may instead use intuitive freehand gestures, such as the framing gesture. This allows a user to interact in a simple, intuitive manner. In addition, the vision engine may also allow for customization of gestures or addition of new gestures.

In exemplary implementations of the invention, relevant information is projected on objects. After the vision engine identifies an object, the interface engine may use a wireless connection to obtain information that is relevant to the identified object. This information may, in turn, be projected on the identified object.

This ability to augment physical objects with digital information is highly advantageous. Rather than being limited to obtaining information from screens, a user may instead view ordinary objects in his or her environment that have been augmented with relevant information. Here are five practical examples, in an exemplary implementation of this invention.

Figure 5:
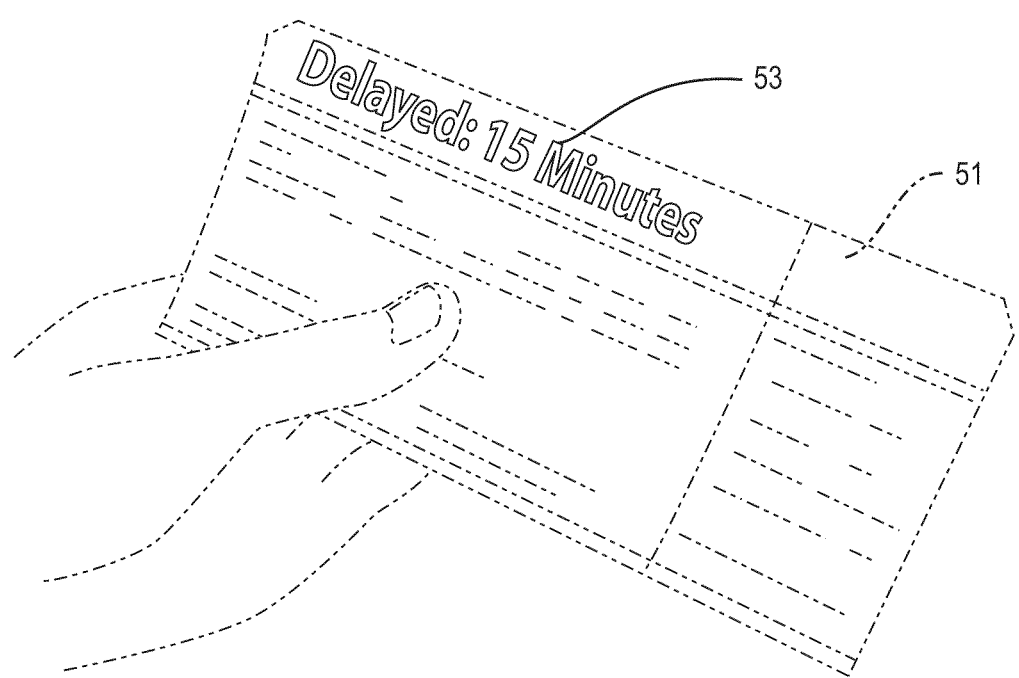
FIG. 5 depicts a user holding an airplane boarding pass, while updated information about the status of the flight is being projected on the boarding pass, in an exemplary implementation of this invention.

First, the vision engine may recognize an airplane boarding pass, either by reading fiducial markers (such as barcodes or semacodes) on the boarding pass, or by matching the pass's image with a pre-stored database of images of boarding passes. This database of boarding pass images may be accessed via the Internet, or may be stored in onboard non-volatile memory. Once the vision engine recognizes the boarding pass, it may notify the interface engine. The interface engine may in turn access the Internet to obtain current updated information regarding the status of the flight to which the boarding pass relates, and then instruct the projector to display this updated information. As shown in FIG. 5, a user may hold a boarding pass 51 for an airplane flight in her hand, while a projector projects a graphical image 53 on the boarding pass. The graphical image 53 conveys the current status of the flight, which (in this particular case) is "Delayed: 15 minutes".

Figure 6:
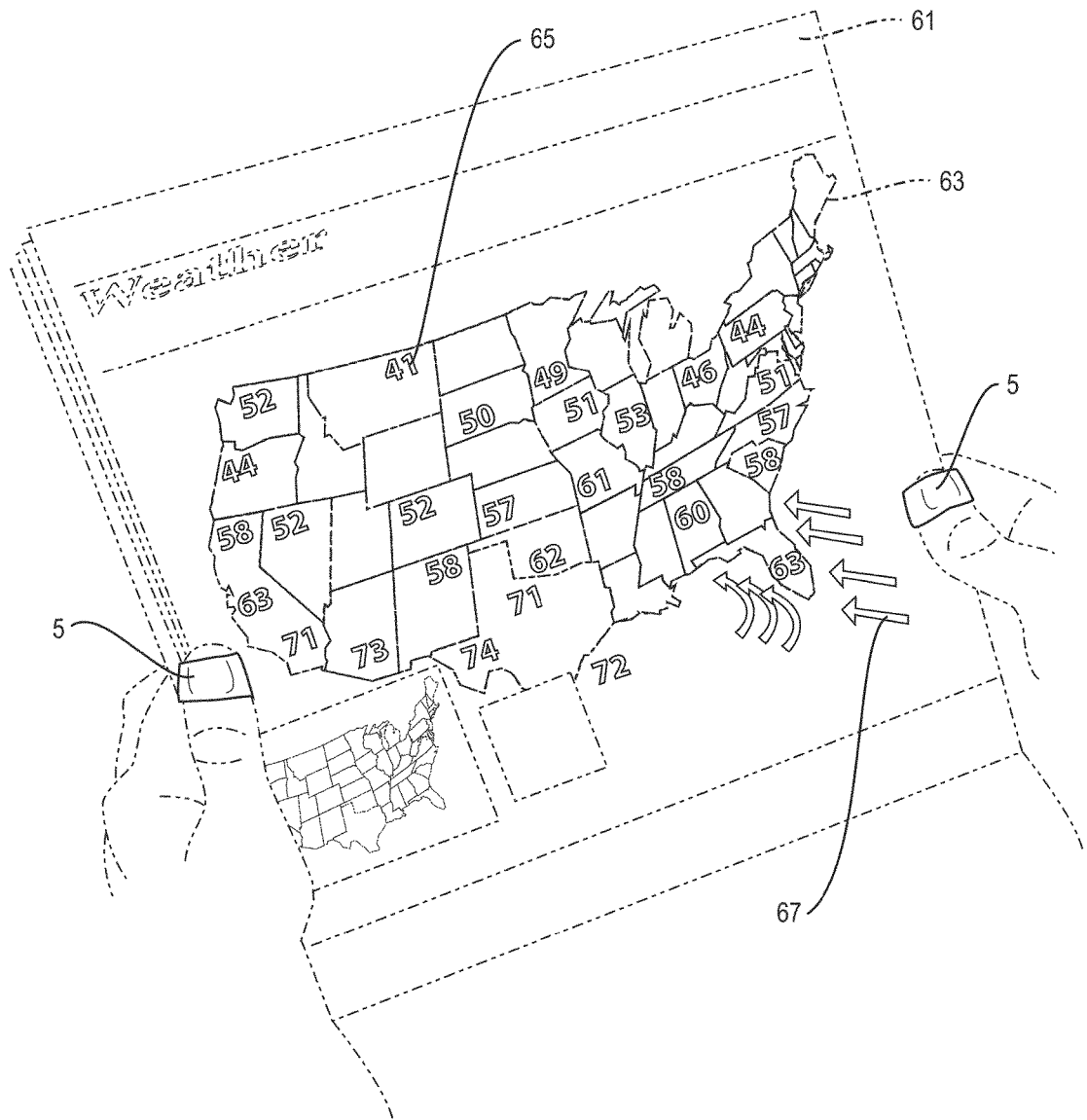
FIG. 6 depicts a user holding a newspaper with a weather map printed on it, while updated weather information is being projected on that map, in an exemplary implementation of this invention.

Second, the vision engine may recognize a weather map that is printed on a newspaper page. The interface engine may access the Internet to obtain updated information relating to the weather map and then provide the projector with this information for projection. The effect is to update the printed map with current weather information. FIG. 6 illustrates such a scenario. In FIG. 6, a user holds a newspaper 61 with a weather map 63 printed on it, while a projector projects a graphical image on the weather map. In this example, this projected image conveys updated temperatures (such as the temperature "41", as shown in 65) and updated movements of weather patterns (such as the arrows shown at 67).

Figure 7:
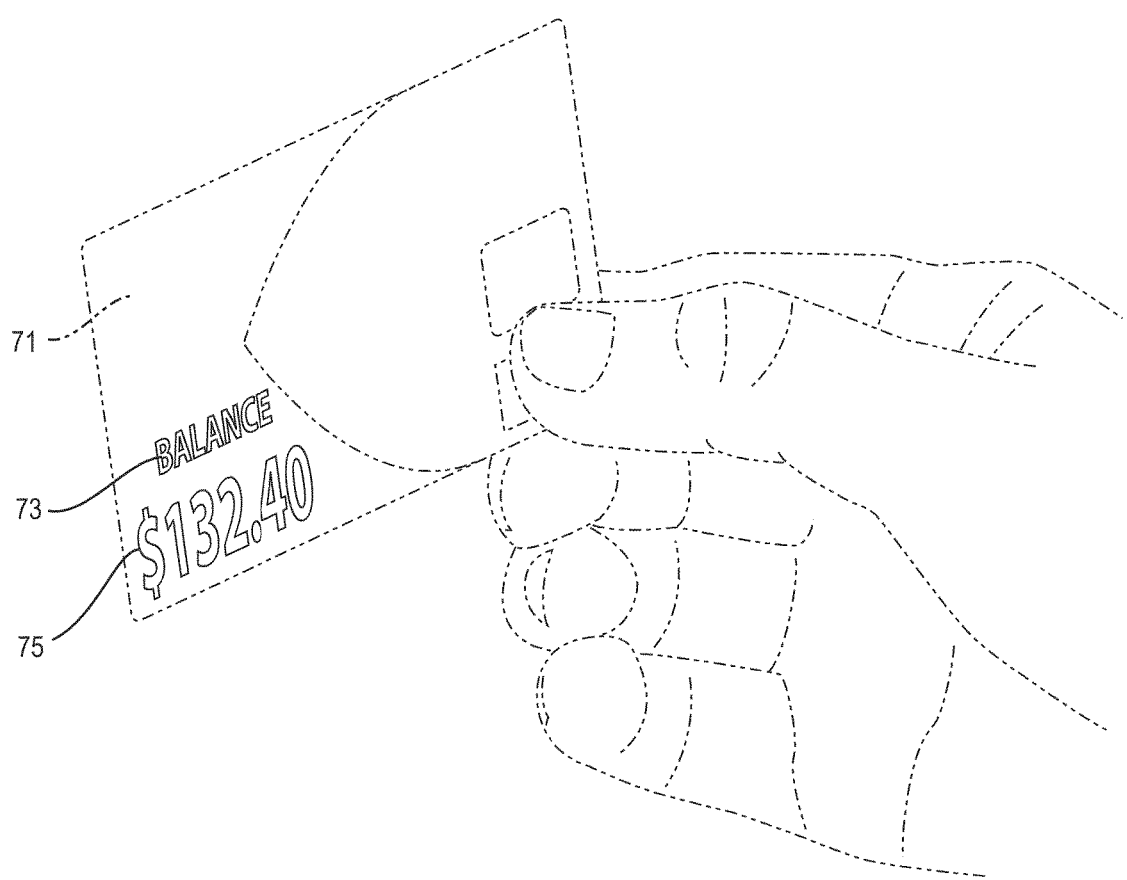
FIG. 7 depicts a user holding a credit card, while the current available balance is projected on it, in an exemplary implementation of this invention.

Third, the vision engine may recognize a credit card. The interface engine may access the Internet to obtain updated information relating to the credit card and then provide the projector with this information for projection. For example, as shown in FIG. 7, a user may hold a credit card 71, while a projector projects a graphical image 73, 75 on the credit card, to convey information regarding the current available balance on the card. In this case, the image comprises text (as shown in 73 and 75) that says "Balance $132.40".

Figure 8:
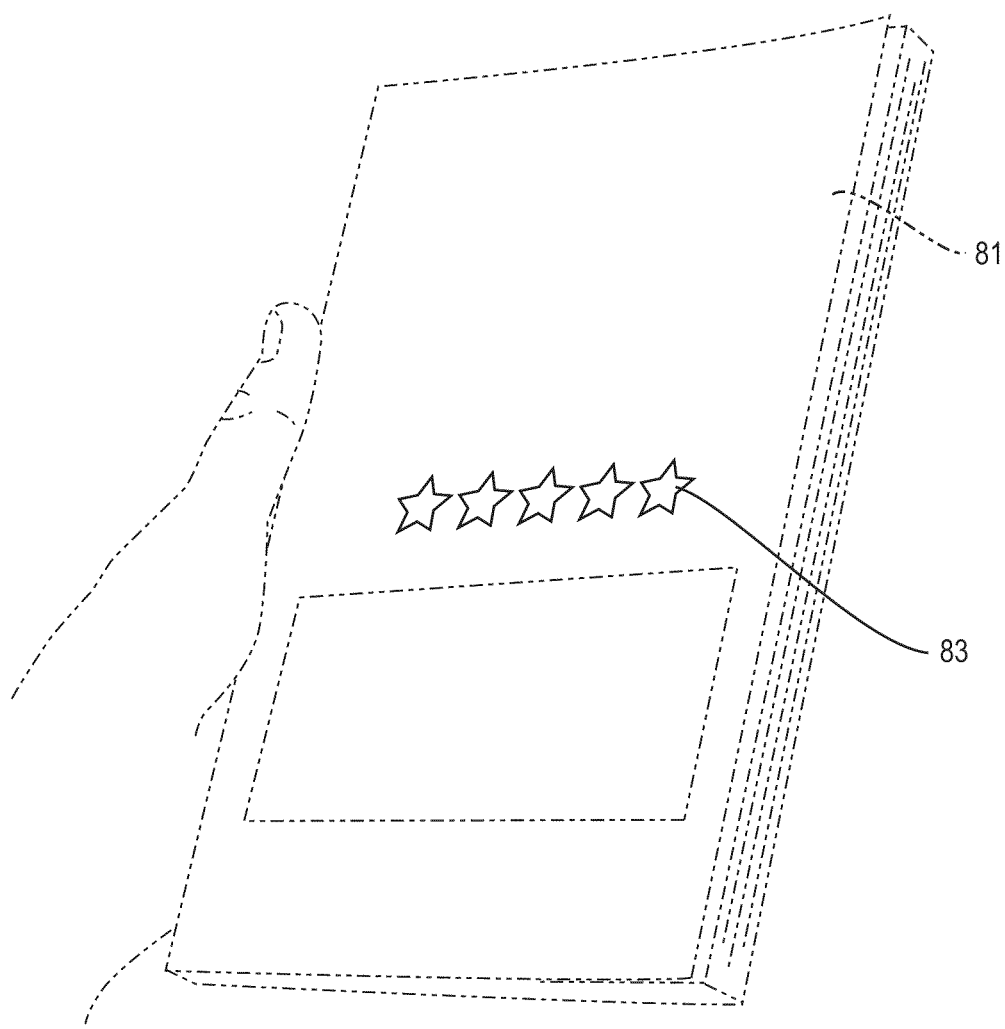
FIG. 8 depicts a user holding a book, while a four-star review of that book is projected on it, in an exemplary implementation of this invention.

Fourth, the vision engine may recognize a book. In a prototype of this invention, the vision engine uses image matching techniques to identify a book by its book cover, by comparing it with a database of about 1000 stored images of book covers. This prototype can also use book barcodes (which convey, among other things, the ISBN code for a book) to identify the book. Once the book has been identified, the interface engine may access the Internet to obtain related information and then provide the projector with this information for projection. For example, as shown in FIG. 8, a user may hold a book 81, while a projector projects a graphical image 83 on the book. In this case, the image comprises five stars 83, signifying a five star review of that book.

Figure 9:
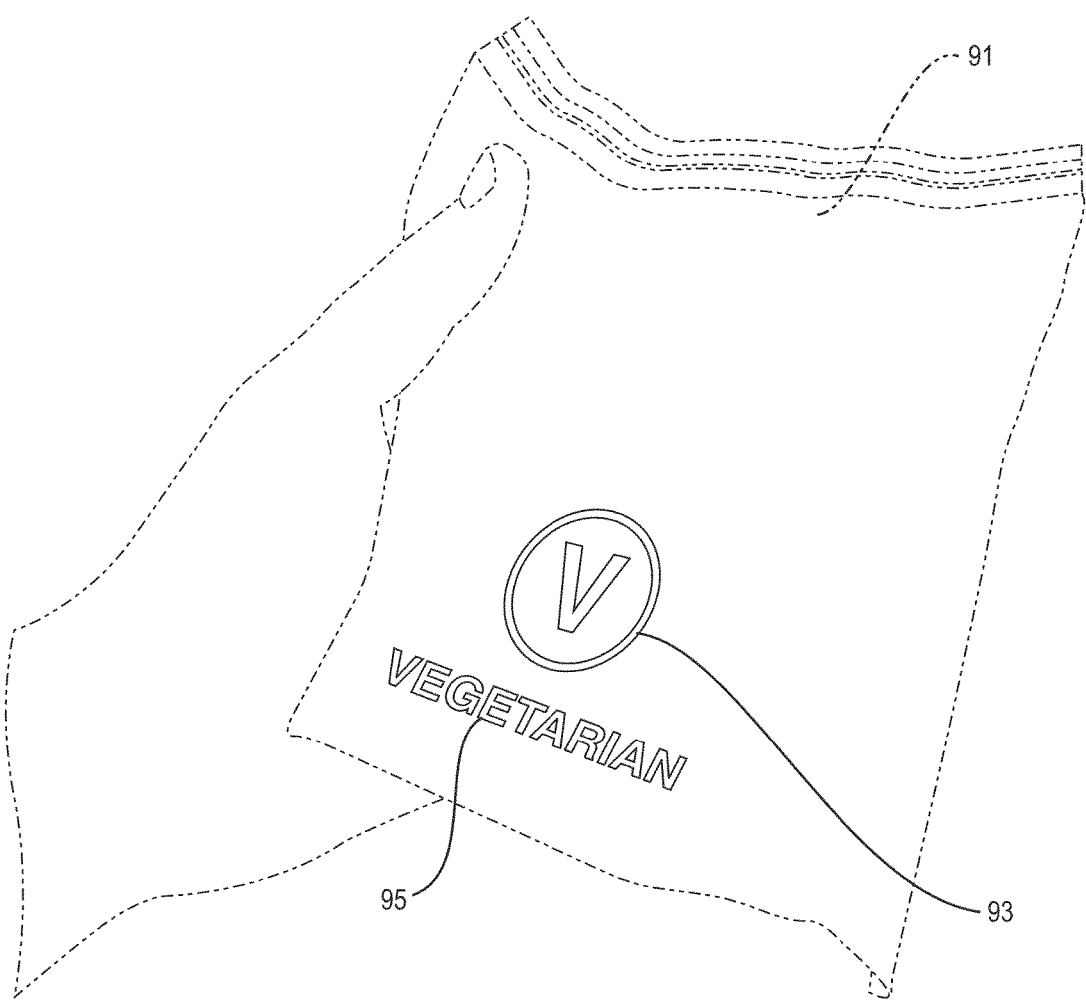
FIG. 9 depicts a user holding a food product, while text and graphics indicating that the product is vegetarian is projected on it, in an exemplary implementation of this invention.

Fifth, the vision engine may recognize a food product, using image matching techniques to identify the product container. In a prototype of this invention, the vision engine uses image matching techniques to identify a product by the appearance of its container, by comparing it with a database of about 1000 stored images of food product containers. This prototype can also use product barcodes (which convey, among other things, the universal product number) to identify the product. Once the product has been identified, the interface engine may access the Internet to obtain information relating to the food container and then provide the projector with this information for projection. For example, as shown in FIG. 9, a user may hold a food container 91, while a projector projects a graphical image 93, 95 on the food container. In this case, the image comprises an icon 93 with a "V" inside of it, and the word "VEGETARIAN" 95, signifying that the food product does not contain meat.

In exemplary implementations of this invention, a user may be provided with both visual and audio augmentation. For example, if the vision engine identifies a book, the interface engine may find related audio files from the Internet and cause them to be played to a user on a headphone or earphone. Or, for example, when a user is meeting another person, visual data captured by the camera may be analyzed in order to determine the other person's identity. Once that person's identity is determined, an audio recording with information about that person may be obtained from the Internet, and then played in the user's ear.

In exemplary implementations of the invention, information that is projected may be comprised of either still images, or dynamic video images. For example, in the case of the weather map discussed earlier, the updated data that is projected may be comprised of still images, such as numerals representing current temperature readings. Or, instead, a video of a weatherperson speaking may be projected on the map.

Figure 10:
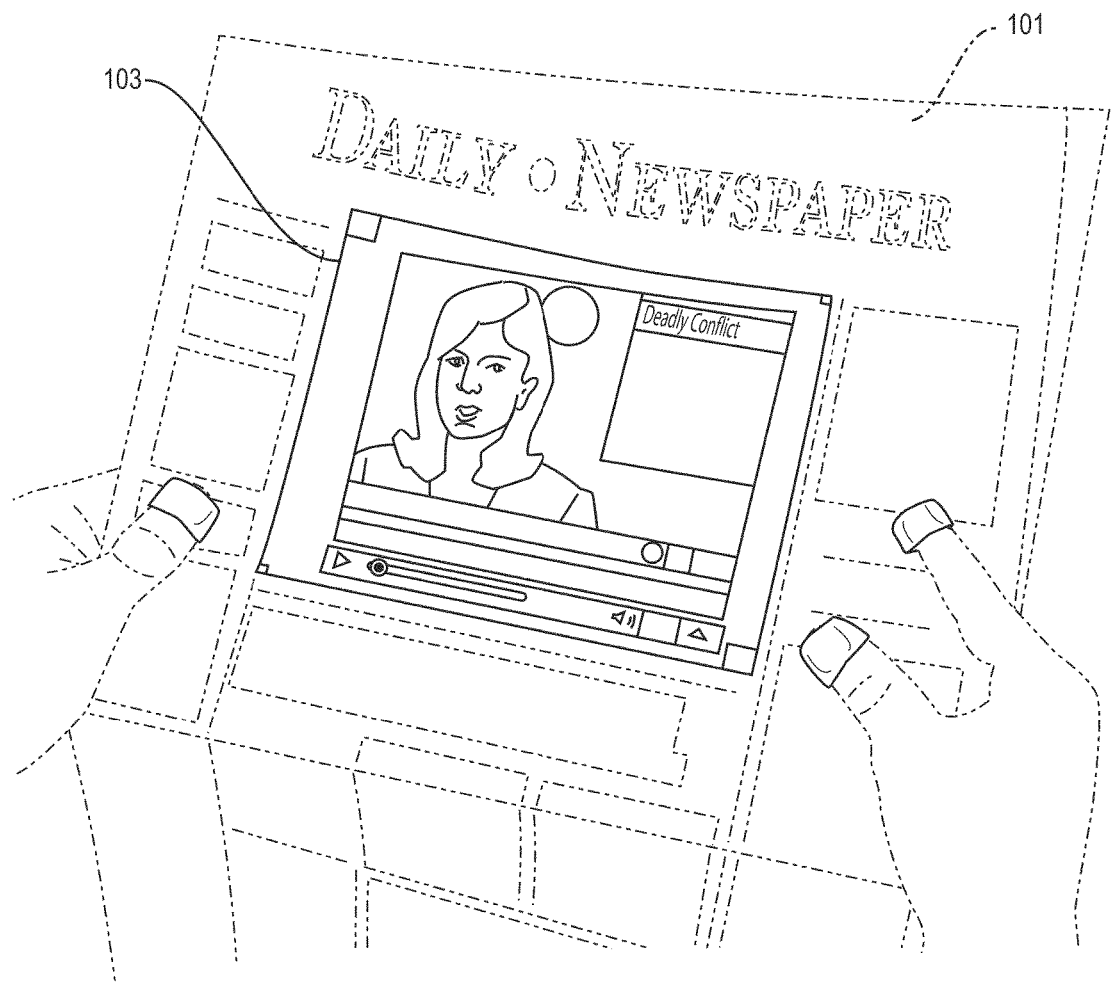
FIG. 10 depicts a user holding a newspaper, while a video of a newscast is projected on it, in an exemplary implementation of this invention. The newscast updates a headline in that paper.

Another example of a video projection, in a prototype of this invention, is shown in FIG. 10. A user holds a newspaper 101 with a headline on it. The vision engine analyzes visual data captured by the camera to recognize the headline, and the interface engine accesses the Internet to obtain a video news story updating the headline. This dynamic video 103 may then be projected on the newspaper. The interface engine may also obtain the audio portion of the newscast from the Internet. That audio portion may be played to a user by employing an earphone.

Figure 11:
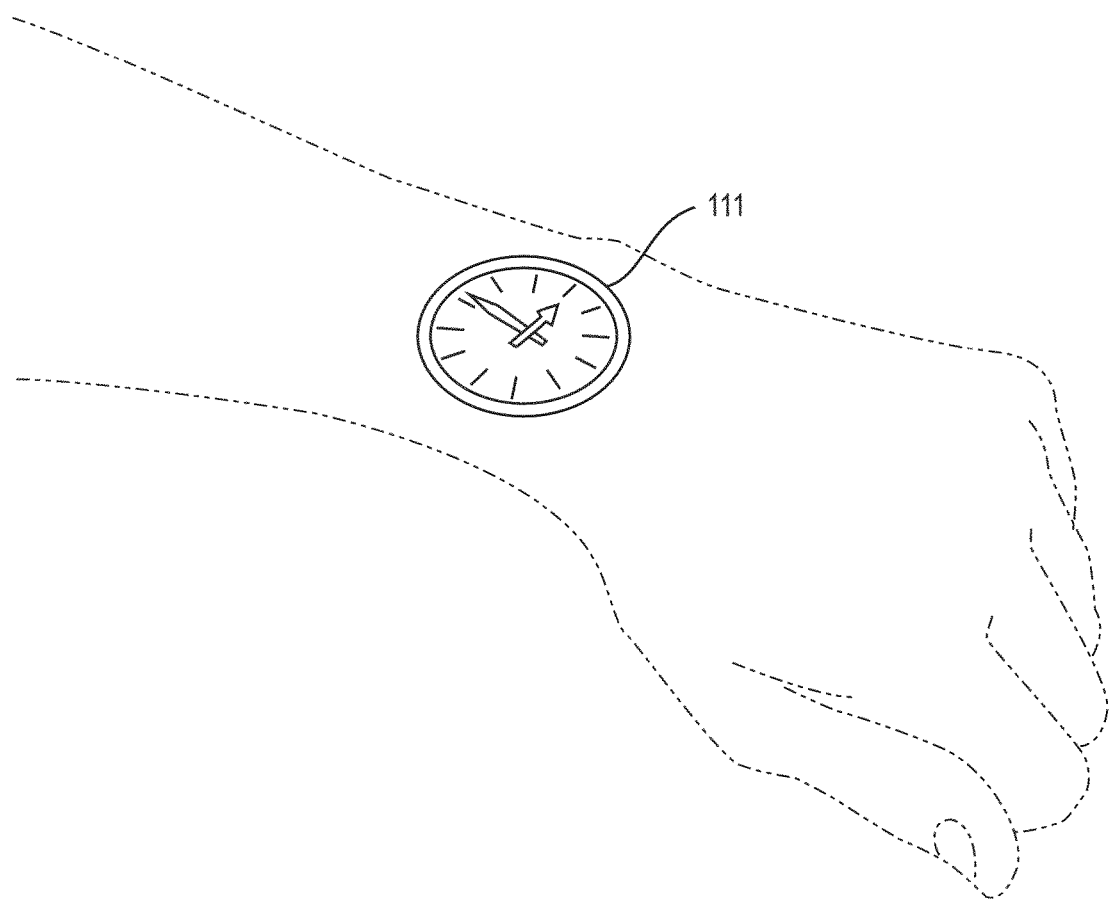
FIG. 11 depicts an image of a watch being projected on a user's wrist, in an exemplary implementation of this invention.

In exemplary implementations of this invention, a user may augment herself—rather than an external object—with digital information. For example, a user may draw a circle on her wrist, thereby selecting a wristwatch application. The vision engine may recognize that gesture and notify the interface engine, which may in turn instruct the projector to project an image of an analog watch on her wrist. FIG. 11 illustrates an image of an analog watch 111 being projected on a user's wrist. The projected watch displays the current time. Time information may be obtained from an onboard electronic clock or may be wirelessly accessed from an external source. The user can get rid of the projected watch by making a crossing out gesture with her index finger. In a prototype implementation of the invention, drawing a circle on the wrist causes a watch to be displayed, whereas drawing a circle on an object other than a wrist indicates selection.

Figure 12:
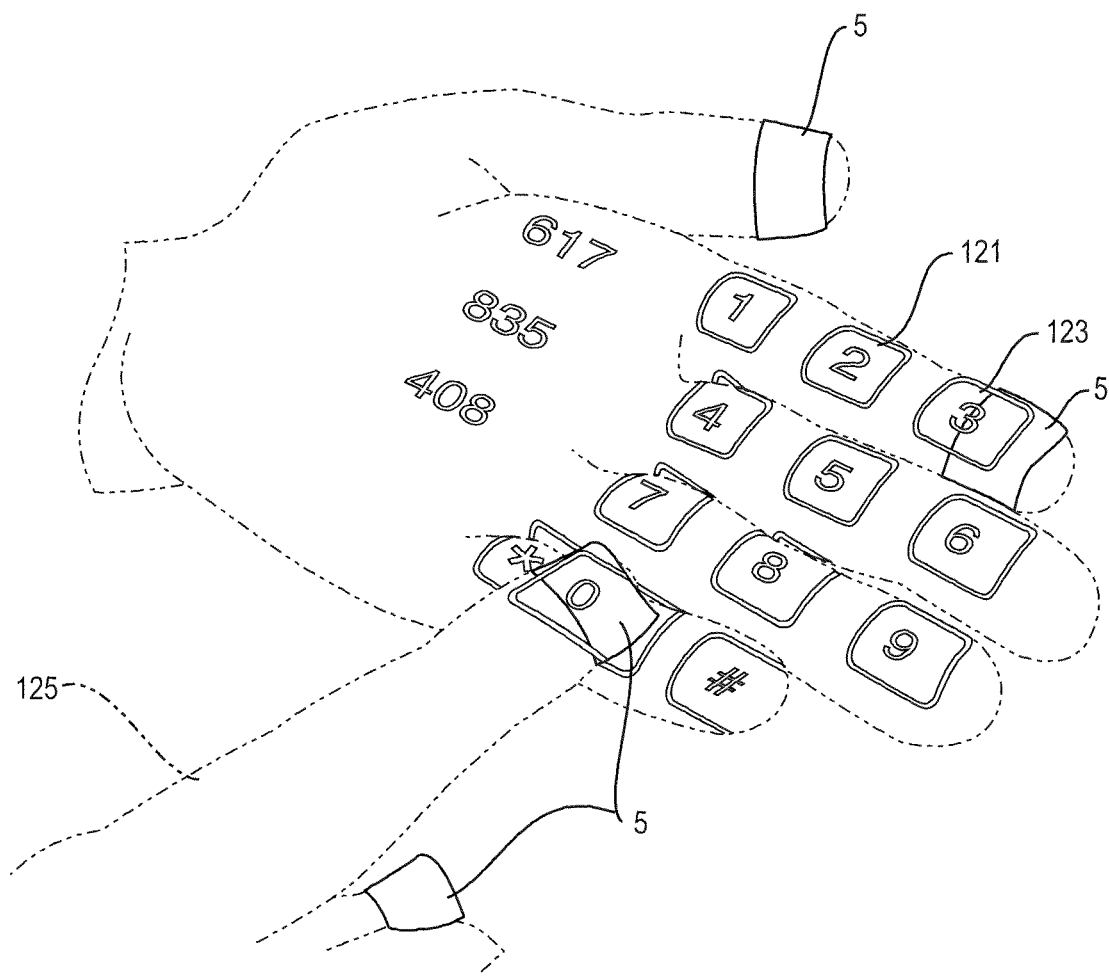
FIG. 12 depicts an image of a dial pad being projected on a user's palm, while the user dials a phone number, in an exemplary implementation of this invention.

Likewise, in exemplary implementations of this invention, a user may project a graphical interface on himself—rather than an external object. For example, a user may open his palm in order to invoke a phone-dialing application. In response to that gesture, the projector may display an image of a dial-pad on the user's palm and fingers. As shown in FIG. 12, that dial-pad may include numeric keys, such as "2" or "3" (as shown at 121 and 123). A user may interact with this projected dial-pad to dial a phone number, by selecting keys of the dial-pad with the index finger 125 of his other hand. Advantageously, this invention may be implemented in such a manner as to correct for movement of the palm. The vision interface may track any change in the palm's position, and feed this updated position information to the interface engine, which may correct the projected dial-pad interface accordingly. The ability of the vision engine to make corrections to alignment, tilt, scale and position of a projected image is discussed in more detail below.

Figure 13:
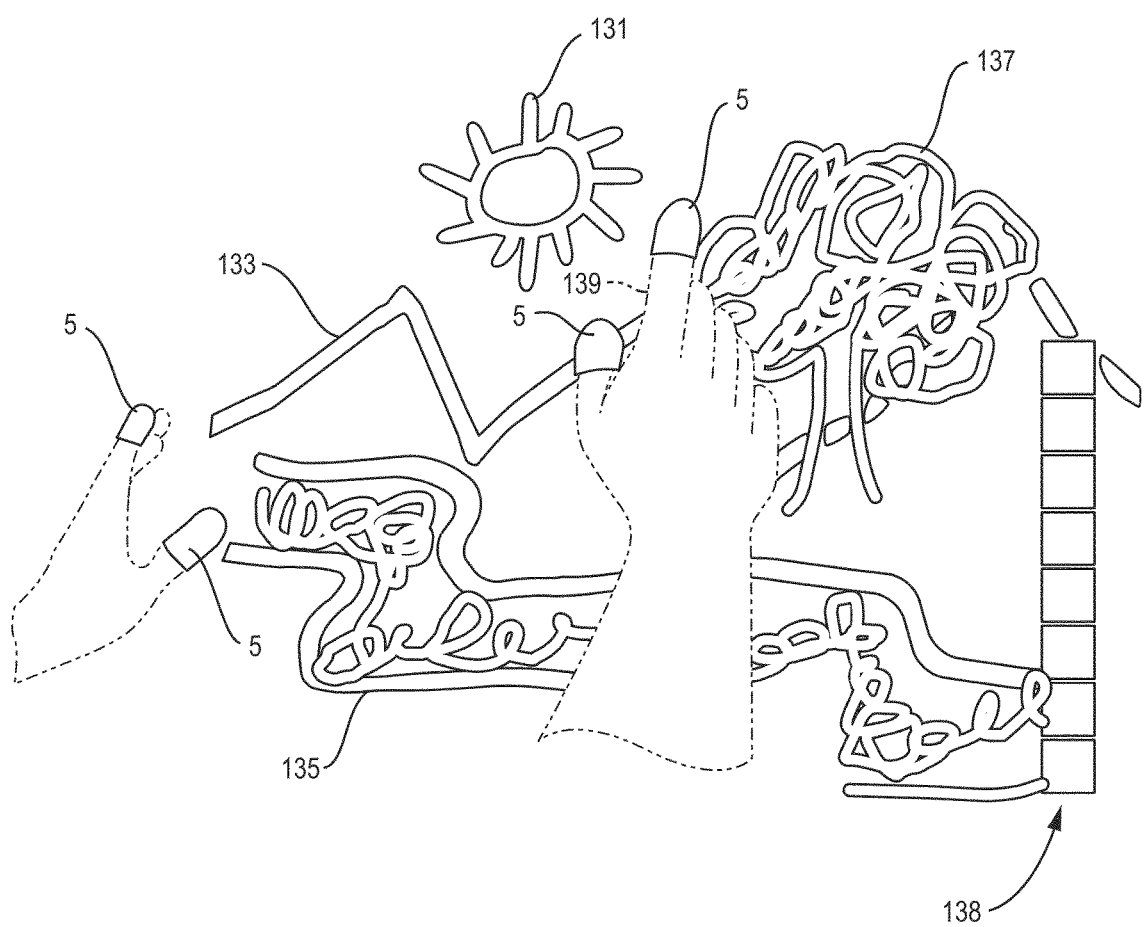
FIG. 13 depicts a user drawing by moving his index finger in the air, while an image of the drawing-in-progress is projected on a wall, in an exemplary implementation of this invention.

In exemplary implementations of this invention, a surface may be augmented with a drawing or doodle. As shown in FIG. 13, a user may draw by moving an index finger 139 in the air. The camera tracks the movements of the index finger, and a drawing or text corresponding to these movements is projected on a nearby surface. The effect is similar to finger painting. A user can choose when and when not to draw. If the index finger of a hand is extended, and the thumb of the same hand is visible to the camera, the vision engine recognizes this gesture as "pen up". If the thumb is not visible, then the vision engine interprets this gesture as "pen down". A user may select the color of the line, by selecting (with his index finger) one of the colored tiles in the color palette 138. In the same fashion, a user may, by moving an index finger in the air, draw text characters that are projected on a surface. FIG. 13 depicts a user making a color drawing with movements of his index finger in the air, in a prototype of this invention. The color drawing is projected on a wall. In FIG. 13, the projected drawing includes yellow lines that depict the sun 131, white lines that depict a mountain range 133, green lines that depict vegetation 137 on a mountain, and blue lines that depict a river 135 (color not shown in FIG. 13).

Figure 14:
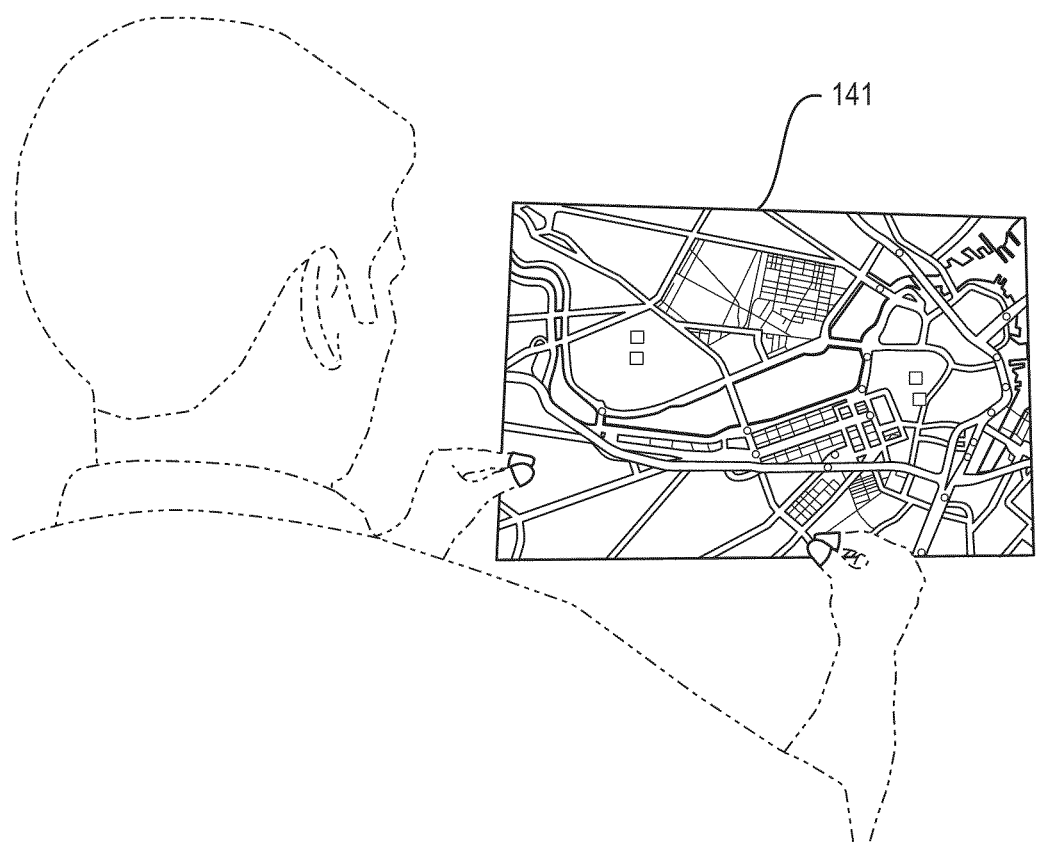
FIG. 14 depicts an image of a map being projected on a wall, while a user makes a pinching gesture to zoom in the map, in an exemplary implementation of this invention.

In exemplary implementations of this invention, a user may interact with a projected map by making gestures in the air. FIG. 14 illustrates such a scenario. A map is projected on a nearby wall. To zoom in the map, the user makes a pinching gesture with each hand and moves the hands away from each other. To zoom out the map, the user moves the pinched hands nearer to each other. To pan the map, the user moves his index finger while the thumb is hidden to the camera (similar to the 'pen down' gesture in the drawing application described above.) In this scenario, suppose a user moves his pinched hands apart. The vision engine recognizes this gesture as an instruction to zoom in, and notifies the interface engine. In turn, the interface engine obtains from the Internet information needed to revise the map (by zooming in), and provides the revised map image to the projector for projection.

Figure 15:
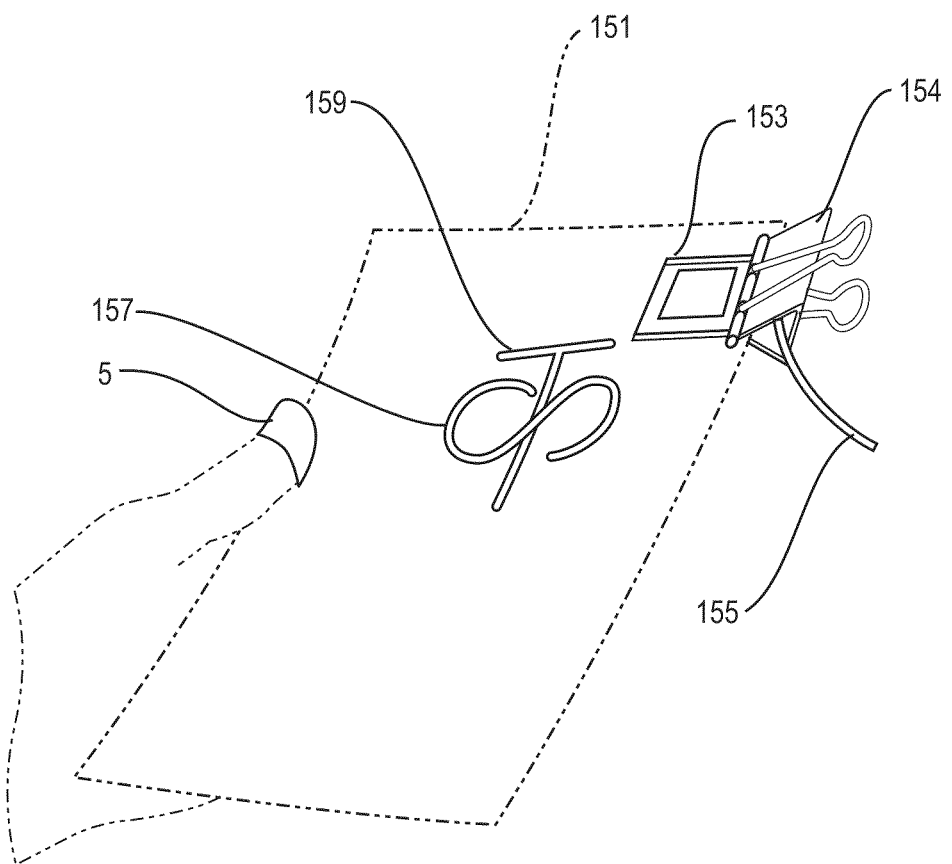
FIG. 15 depicts a user holding a blank sheet of paper, while an image of a doodle is projected on it. The projected doodle corresponds to doodling motions that were made by the user while touching the sheet of paper, in an exemplary implementation of this invention.

In exemplary implementations of this invention, drawing motions need not always be made in the air. They may also be made while touching a surface. FIG. 15 illustrates such a scenario. In FIG. 15, a user holds a sheet of paper 151, to which a microphone 153 has been clipped with a binder clip 154. A cable 155 provides electronic connections between the microphone 153 and a computer 10. The user makes drawing motions by moving his index finger while it is in contact with the paper, as if the finger were a stylus. The vision engine uses color tracking to track the motion of the user's index finger. However, this color tracking does not provide a precise indication of when the touch event begins and ends. The microphone 153 is used to solve this problem. It detects the sound of a finger touching the paper, and thus precisely indicates the timing of the touch-based gestures. In FIG. 15, a user has used touch-based interactions to make a doodle. The doodle is projected on a wall. The projected doodle comprises a "T" 159 and a sideways "S" 157.

Figure 16:
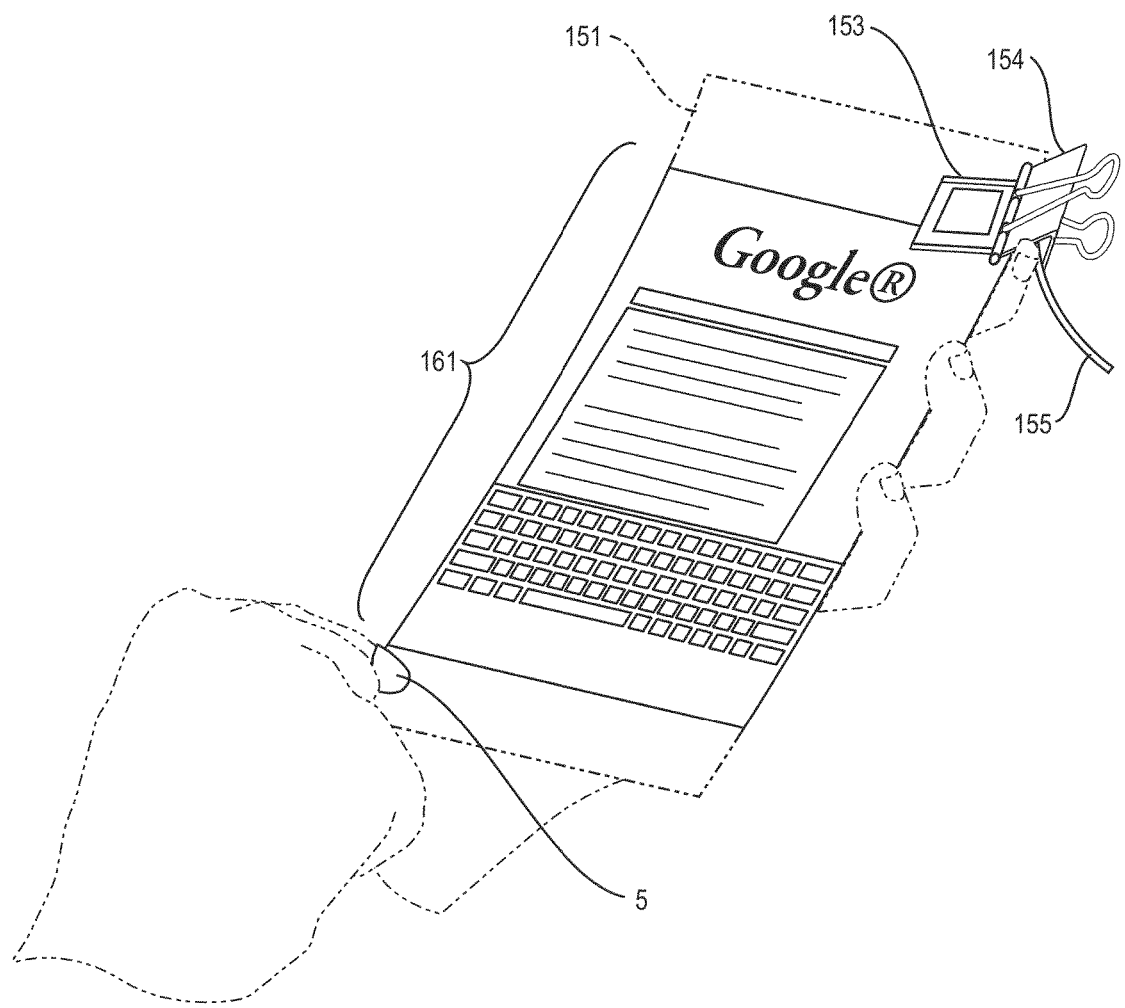
FIG. 16 depicts a user holding a blank sheet of paper with one hand, while a graphical interface obtained through an Internet browser is projected on the paper and the user interacts with the projected interface with his other hand, in an exemplary implementation of this invention.

In a similar fashion, touch-based gestures may be used to interact with a graphical interface, in exemplary implementations of this invention. FIG. 16 illustrates such a scenario. In FIG. 16, an image of a Google® search page 161 is projected on a blank sheet of paper 151, to which a microphone 153 has been attached by a binder clip 154. A user interacts with the projected graphical interface by making touch gestures with his finger, in a manner similar to how the user would interact with such an interface if using a computer screen and keyboard. The touch movements are detected by color tracking and sound detection, in a manner similar to that discussed with respect to FIG. 15. The effect is that the user employs a web browser, by making touch gestures to interact with a graphical interface that is projected on the blank sheet of paper.

Figure 17:
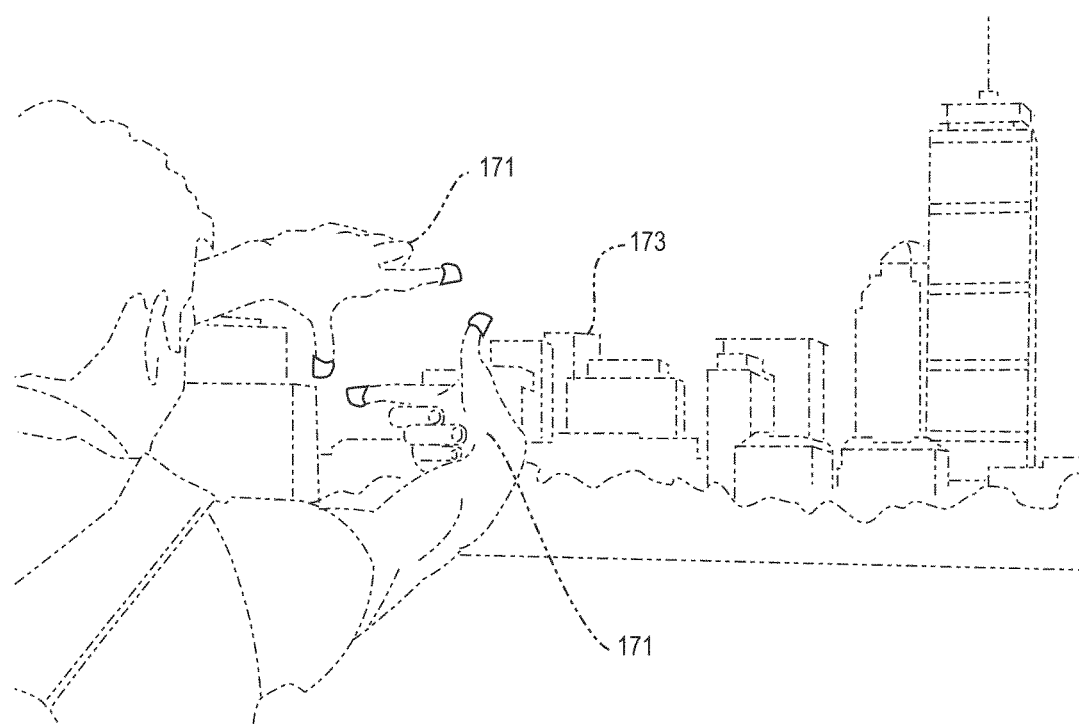
FIG. 17 depicts a user making a framing gesture with his hands, which gesture is an instruction to the camera to take a photograph of the scene in front of the user, in an exemplary implementation of this invention.

In exemplary implementations of this invention, a user may take a photograph by making a gesture in the air—rather than by touching or clicking on a camera. FIG. 17 depicts such a scenario. A user makes a framing gesture 171 with his hands. The computer recognizes this as an instruction to take a photograph, and passes this to the camera. The camera captures the photograph, which may be stored in volatile or non-volatile memory.

In exemplary implementations of this invention, a user may interact with a graphical interface that is projected on an object by manipulating the object itself—rather than by making gestures in the air.

Figure 18:
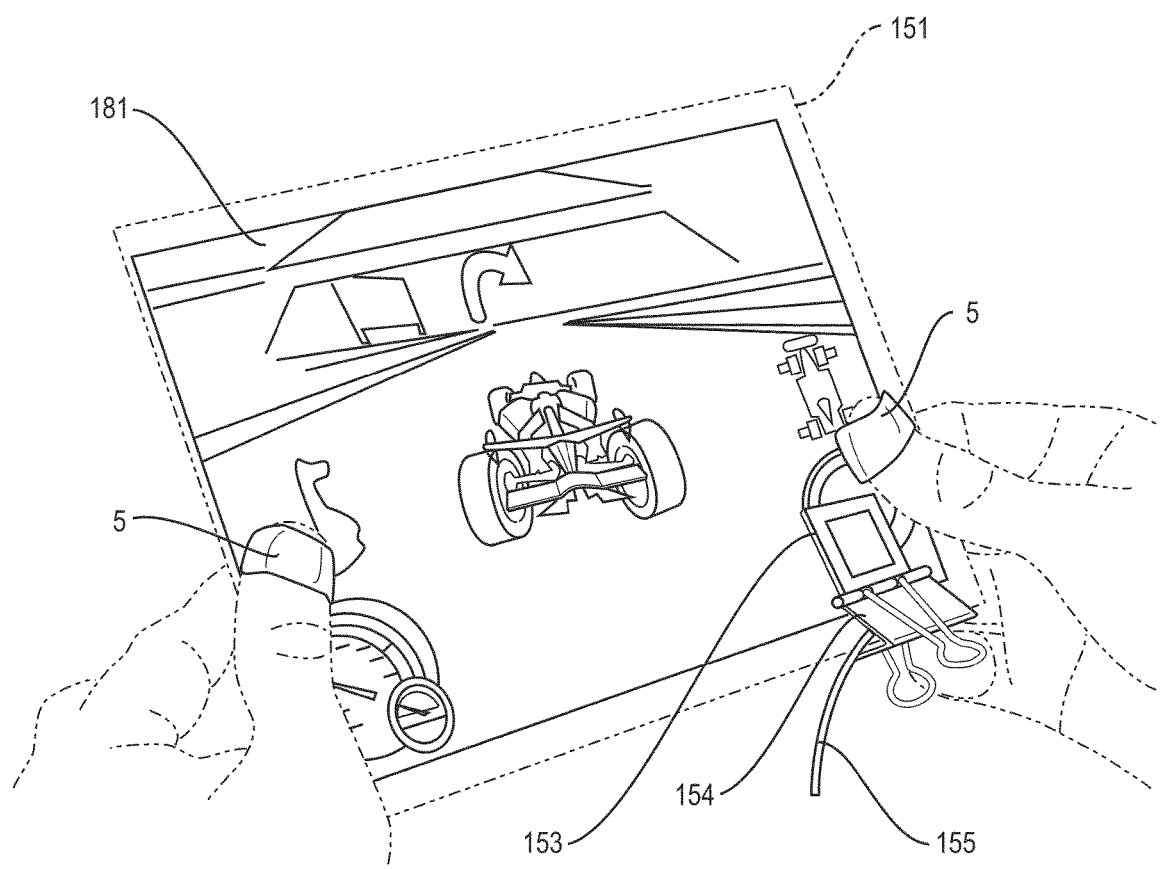
FIG. 18 depicts a user holding a blank sheet of paper, while a video game of a car race is projected on it, in an exemplary implementation of this invention.

For example, in an exemplary implementation of this invention, a user may play a car racing game by holding a sheet of paper and changing its tilt and direction. FIG. 18 illustrates such a scenario. A graphical interface for a car racing game 181 is projected on a blank sheet of paper 151. A user holds the paper, and controls the car in the car game by changing the position of the paper. Based on the camera input, the vision engine detects the tilt and rotation of the paper, emulating an accelerometer. The game reacts to these gestural interactions by altering the speed and direction of the car. For example, tilting the paper forward accelerates the car and tilting the car backward slows it down. Tilting the paper to the right makes the car steer right, and the tilting to the left makes the car steer left. This video game may be enhanced with sound effects, such as an engine revving or other race track sounds. The user may listen to these sound effects with headphones.

Figure 19:
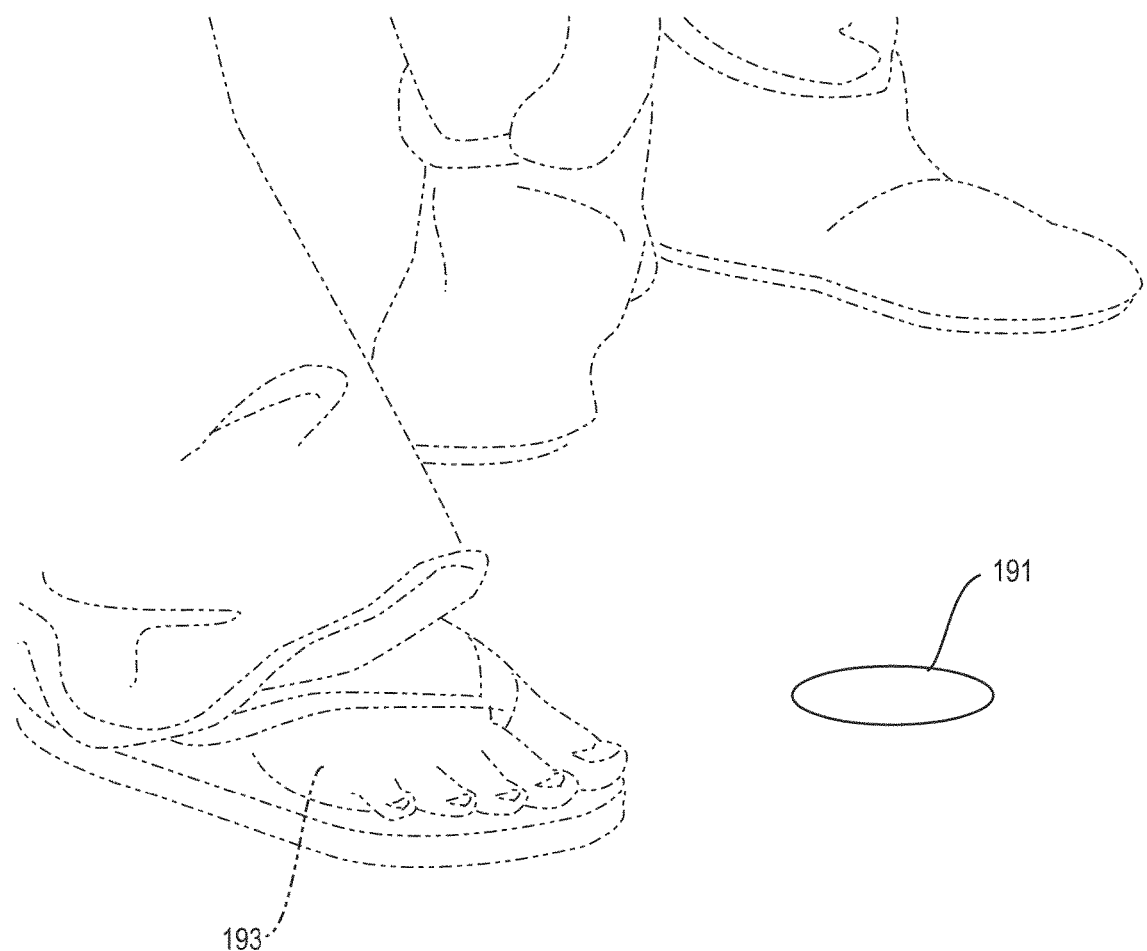
FIG. 19 depicts an image of a ball being projected on a floor, while a user moves his foot to kick the projected ball, in an exemplary implementation of this invention.

In exemplary implementations of the invention, a user may make motions with body parts other than hands or fingers, in order to interact with a projected image. For example, a ball game with a projected image of a ball may be played by multiple players. FIG. 19 illustrates such a scenario. The projector projects an image of a ball 191 on a floor, and players may kick the projected ball with their physical feet. (e.g., 193) The vision engine recognizes the feet and the projected ball, and passes this information to the interface engine, which changes the location of the projected ball according to how the ball is kicked.

In exemplary implementations of the invention, an image on one surface may be copied, and then projected on another surface. For example, a user makes a certain hand gesture, as an instruction to copy a portion of a page of a physical book and to project the copy on a sheet of paper. The vision engine recognizes this instruction and the portion of the page to be copied. The projector then projects this copy on the sheet of paper.

Figure 20:
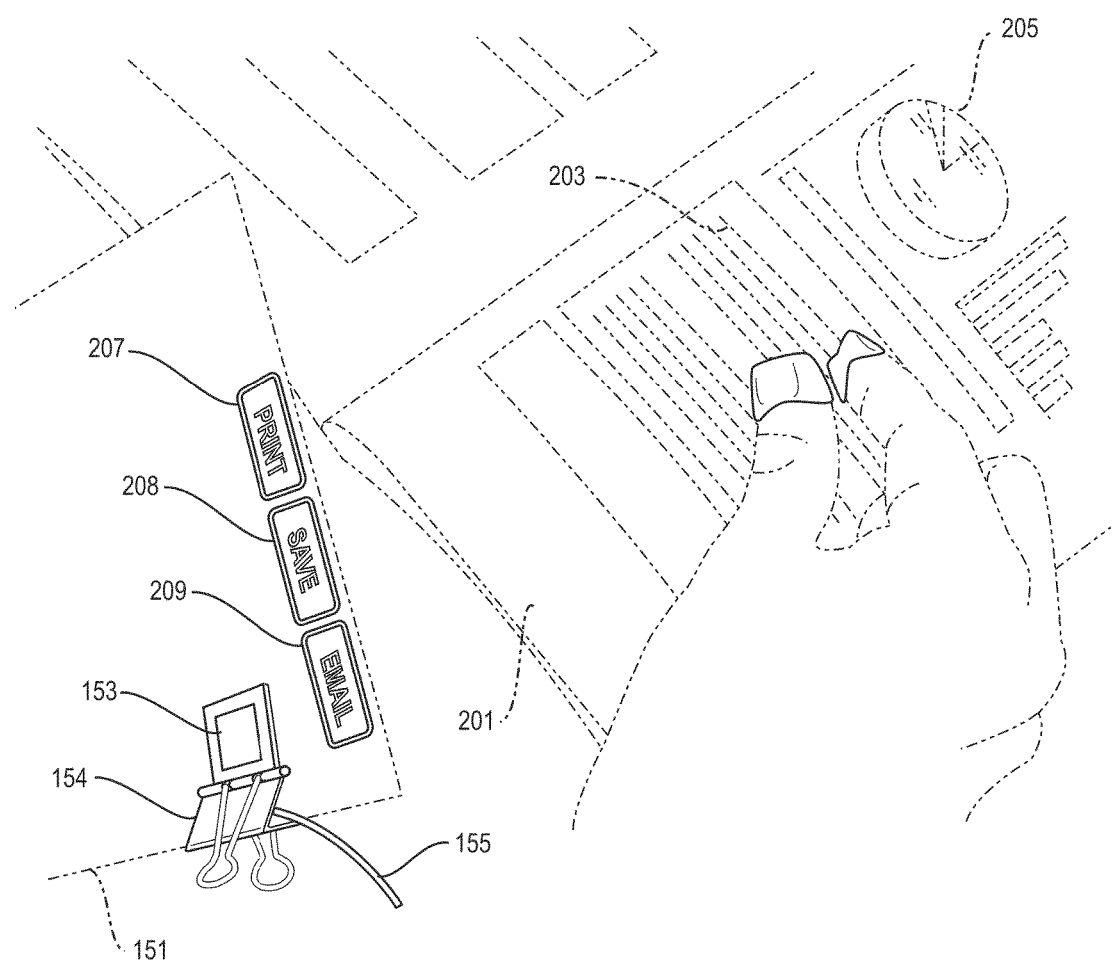
FIG. 20 depicts a book lying open on a desk and a user making a pinching motion, as an instruction to copy text from a page of that book and to project that copy on another surface, in an exemplary implementation of this invention.
Figure 21:
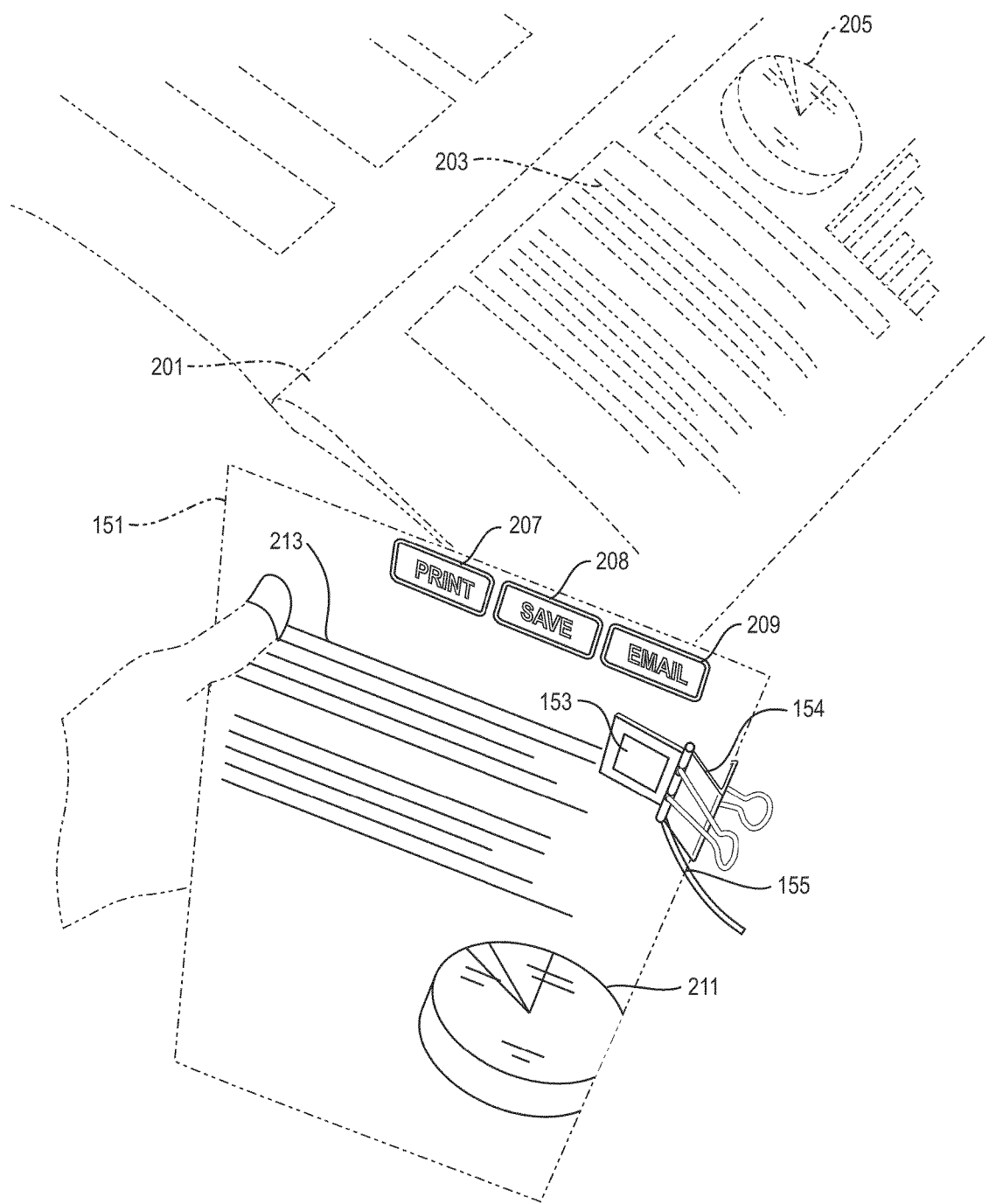
FIG. 21 depicts a user holding a blank sheet of paper, while an image of the copied text and a copied graph are projected on that sheet of paper, in an exemplary implementation of this invention.

FIGS. 20 and 21 illustrate an example of this application of the invention. In this example, a page of a book 201 lies open on a desk. A block of text 203 and a circle graph 205 are printed on the book page 201. A user makes certain hand gestures (one of which is to pinch his fingers over the block of text as if to grab it). The vision engine recognizes these gestures as instructions to copy the block of text 203 and circle graph 205 from the book page 201 and to project them on to another sheet of paper 151. The vision engine passes these instructions to the interface engine, which implements them. FIG. 21 shows a copied image of the block of text 213 being projected on to a sheet of paper 151. It also shows a copied image of circle graph 211 being projected on that sheet of paper 151.

In the example shown in FIG. 21, "Print" 207, "Save" 208 and "Email" 209 icons are also projected on the sheet of paper 151. A user may interact with these icons by making a touch gesture to select them. For example, if a user touches the "Email" icon 209, this initiates an email graphical interface, which the user may use to send the copied block of text 213 and copied circle graph 211 as an attachment to an email. Also, for example, if a user touches the "Print" icon 207, this initiates a print graphical interface, which the user may use to print the copied block of text 213 and copied circle graph 221. Also, for example, if a user touches the "Save" icon 208, this initiates a graphical interface that allows the user to store the copied images of the text 213 and circle graph 213 in non-volatile memory. A user's touch gestures are detected from both visual data captured by a camera 3 and sound data captured by a microphone 153. The microphone 153 is attached to the sheet of paper 151 by a binder clip 154. A cable 155 provides electronic connections between the microphone 153 and the computer 10.

In the previous example, neither the surface from which the images are copied nor the surface on which the copied image is projected is a computer screen. Alternately, in some implementations of this invention, a user may make hand gestures in the air as instructions to copy an image from one surface and cause it to be displayed on a computer screen, or vice versa.

Figure 22:
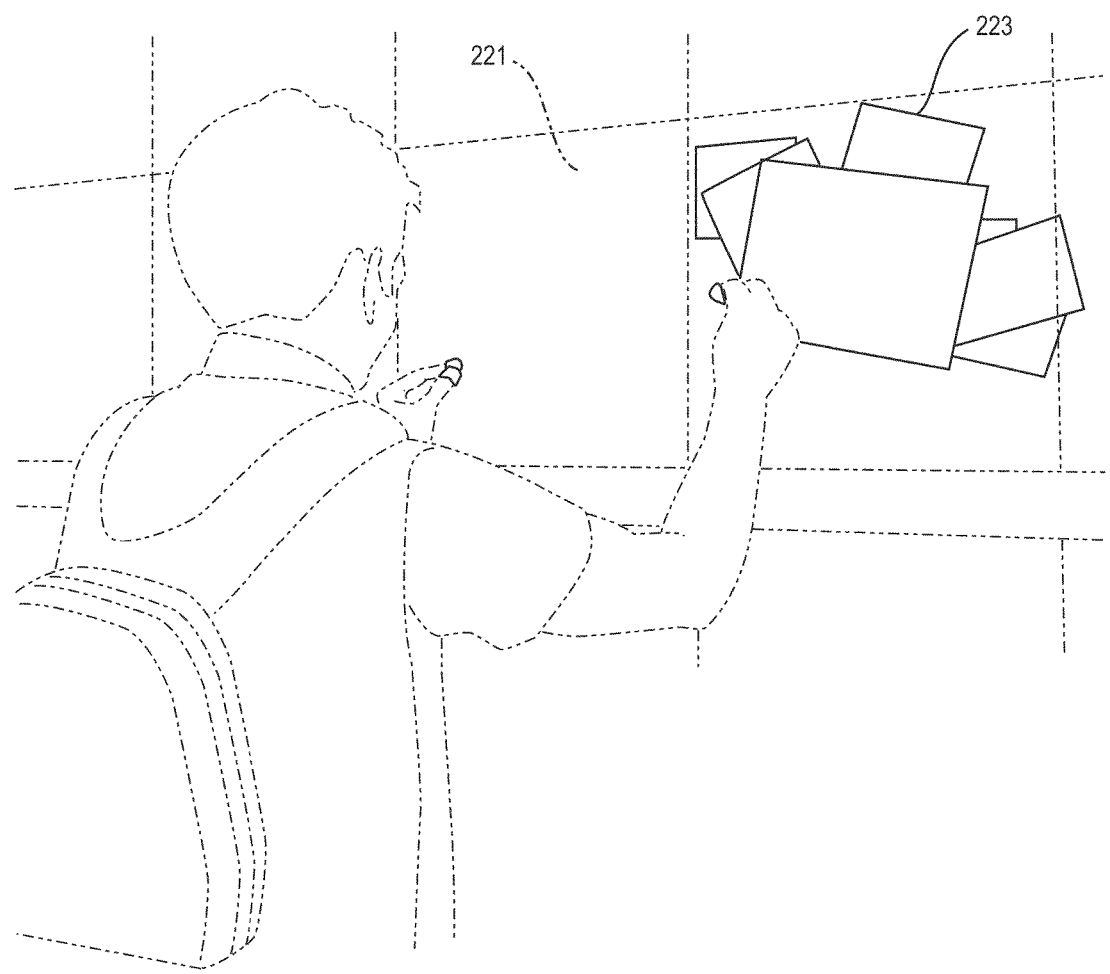
FIG. 22 depicts a set of stored photographs being projected on a wall, while a user makes hand gestures to browse through them, in an exemplary implementation of this invention.

In exemplary implementations of the invention, a user may use hand gestures to browse through information that has been projected on a surface. For example, as shown in FIG. 22, images of photographs 223 may be projected on a wall 223. A user may browse through the projected photos by making hand gestures.

In exemplary implementations of this invention, an application may be opened in three different ways.

Figure 23:
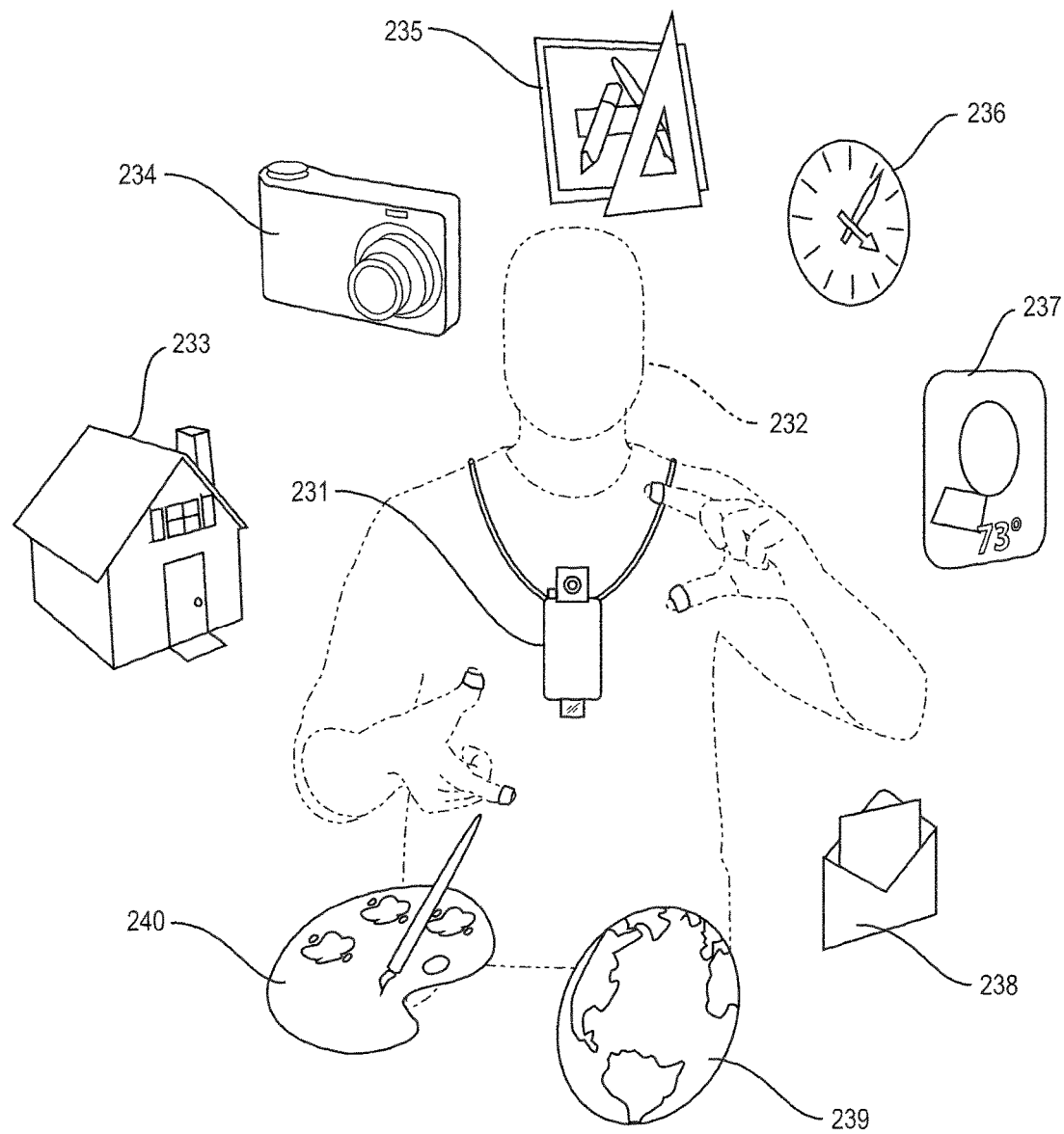
FIG. 23 depicts a menu of application icons being projected on a surface, while a user makes hand gestures to interact with that projected menu, in an exemplary implementation of this invention.

First, a user may open an app by interacting with a "Home" graphical interface. The "Home" interface presents a menu of icons that represent applications that the user may select. This interface may be projected on a nearby surface. In the example of a "Home" interface shown in FIG. 23, the menu of icons represent the following applications: home 223, camera 234, settings 235, watch 236, weather 237, email 238, map 239, and draw 240. A user 232 may open an application by moving his index finger and selecting the icon for that app (by hiding the thumb from the camera). A user may also add or delete icons from the Home menu.

Second, a user may open an application by drawing a symbol for that app with his index finger or making a hand gesture. For example, a user may open an Email app by making drawing an "@" symbol with his index finger. Or, for example, a user may open the Home app by making a namaste gesture.

Third, the interface engine may, in some cases, open an application based on a context detected by the vision engine. For example, when the vision engine detects a book in a user's hand, then the interface engine may open the book review application.

Also, in exemplary implementations of the invention, some applications may constantly be running in the background. For example, the camera (photo taking) application may constantly run in the background. A user does not need to open that app in order to take a photo.

In exemplary implementations of this invention, a user may use the Settings application (available from the Home application) to set preferences and add and delete gestures. For example, the Settings app provides a user with a list of installed applications. If a user selects an app from that list, the Setting app projects the settings of that particular app and allows the user to configure them. The Setting app also presents the user with options to add or change a gesture. The user may select the option "change gesture" and perform the new gesture in order to change it. The user may then confirm that he wants to use the new gesture in place of the earlier one. To add a gesture, the user may select "add new gesture", and then perform the new gesture and indicate the action to which it corresponds. The interface for the Settings application may be projected on a nearby surface.

Alternately, a user may set user preferences by interacting with an interface displayed on a cellphone screen or computer screen. In cases where such screen is not onboard, said inputted preferences may be transmitted to an onboard computer by the Internet. For example, such user preferences may determine what type of information is projected when an object of a particular type is recognized (e.g., which source of book reviews to use when a book is recognized).

In exemplary implementations of this invention, a user may check emails projected on a nearby wall or surface. A user may select the Email application by selecting the mail icon on the projected Home page or by just drawing an '@' symbol in the air with his index finger. When the vision engine recognizes this selection, the interface engine may wirelessly access the Internet to obtain email messages and provide them to the projector for projection. A user may interact with the Email app with hand gestures in the air.

Similarly, in exemplary implementations of this invention, stock market updates may be projected on a nearby surface. A user may customize the list of the companies he is interested in following.

Figure 24:
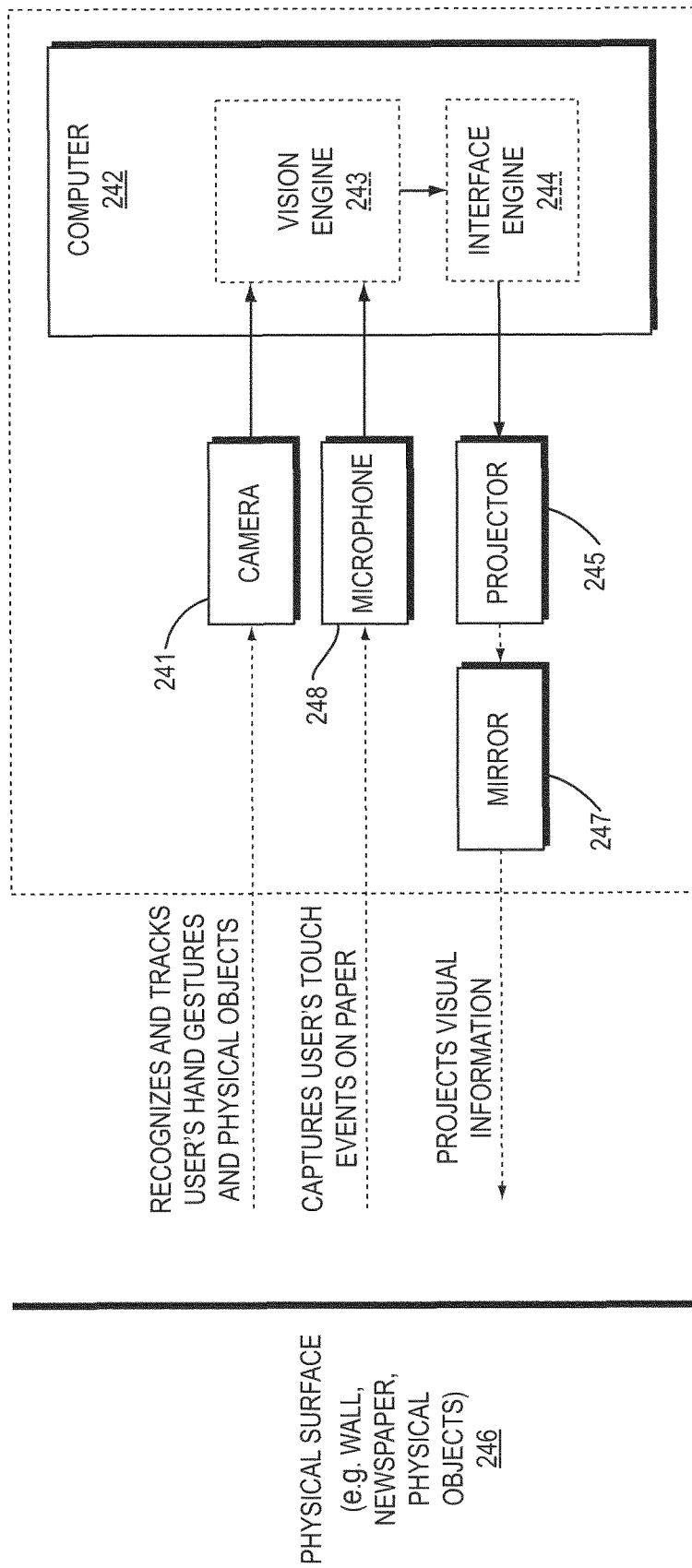
FIG. 24 is a diagram that shows a high-level summary of the hardware and software of an exemplary implementation of this invention.

FIG. 24 is a diagram that shows a high-level summary of hardware and software in an exemplary implementation of this invention. A pendant-like unit is adapted to be worn about a user's neck. This unit is comprised of a camera 241, computer 242, projector 245, mirror 247 and microphone 248. The camera 241 captures video of the scene in front of the user. The computer employs two key software programs: a vision engine 243 and an interface engine. 242. The vision engine 243 processes visual data captured by the camera to recognize and track a user's hand gestures and physical objects. The microphone 248 may be affixed to a surface, such as a sheet of paper, and used to detect the sound of touch events. Such touch events occur when a user (or something worn or held by the user) touches a surface to which the microphone is affixed. The vision engine 244 provides data representing the images that the projector will project 245. The projector 245 projects visual information on a physical surface, such as a wall, newspaper or other physical object 246

The video data captured by the camera 241 includes hand gestures (used in gesture recognition), objects held by the user (used in object recognition), and projected images (used to correct the alignment, placement and appearance of the projected graphical images). The camera 241 is also used to take photographs of the scene in front of a user when the user makes a framing gesture.

The projector 245 visually augments surfaces, walls and physical objects with which the user is interacting. It does so by projecting information and graphical user interfaces. The computer 242 provides the projector with the content to be projected. The projector 245 projects graphical user interface of the selected application on surfaces or walls. It also may augment physical objects by projecting just-in-time and related information from the Internet. The mirror 247 may be used to adjust the direction of the light projected from the projector.

The camera 241, projector 245 and microphone 248 are connected to the computer 242 using wired or wireless connections. The computer 242 is wirelessly connected to the Internet. This wireless connection may be a 3G network.

Figure 25:
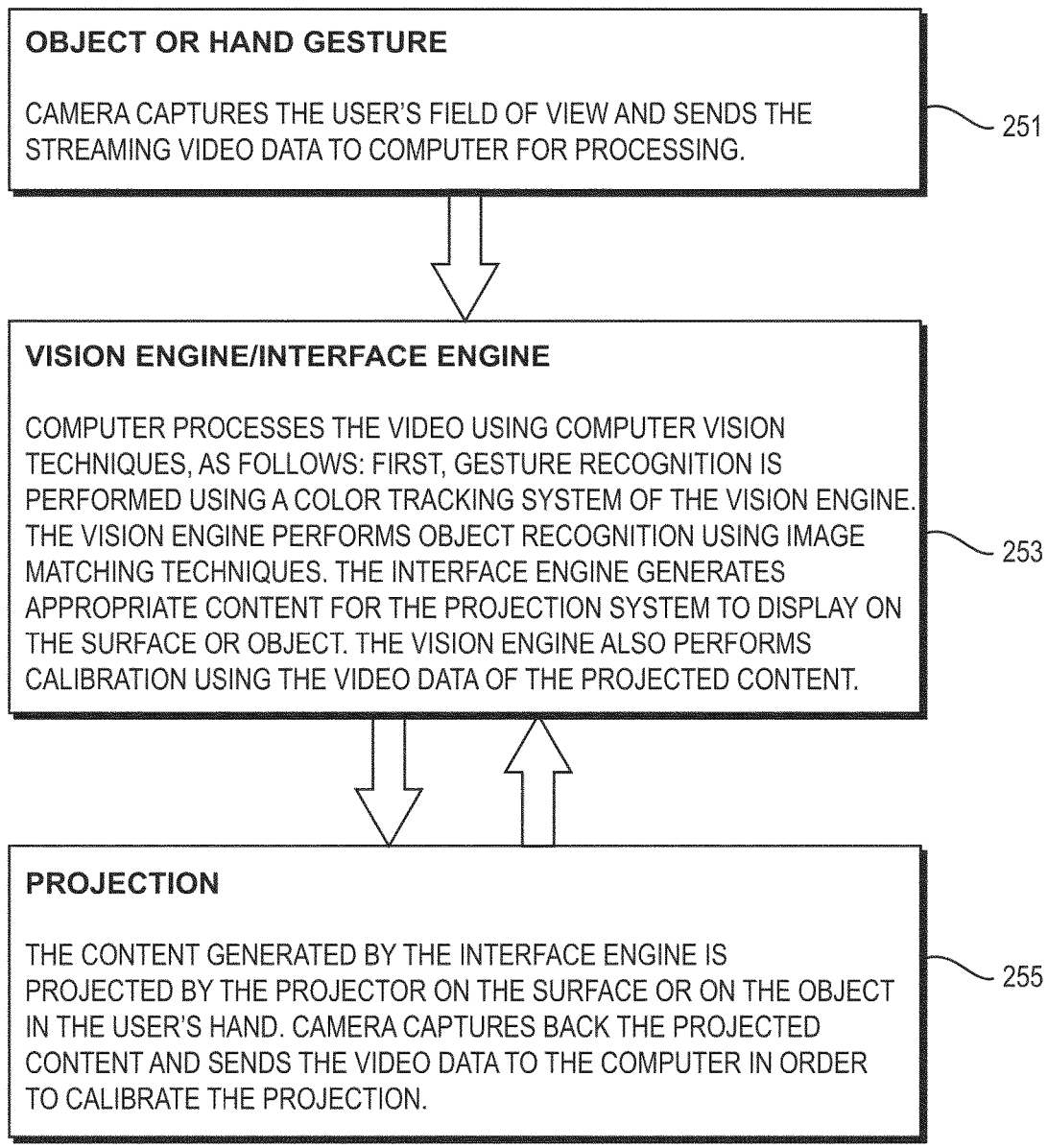
FIG. 25 is a flow chart that shows a high-level summary of the functionality of an exemplary implementation of this invention.

FIG. 25 shows a high-level summary of the functionality of an exemplary implementation of this invention. A camera captures a user's field of view and sends streaming video to a computer. Thus, objects and hand gestures 251 that appear in this field of view are captured by the camera. The computer employs software comprised of a vision engine and interface engine 253. The computer processes the video using computer vision techniques. The vision engine performs gesture recognition using color tracking. The vision engine also performs object recognition using image matching techniques. The interface engine generates appropriate content to display on the surface or object. The vision engine also performs calibration using video data of the projected content. The content generated by the interface engine 255 is projected by the projector on a nearby surface or object. The camera captures the projected content and sends the video data to the computer in order to calibrate the projection.

In a prototype of this invention, the software program was developed using C++, C# and Windows® Presentation Foundation™ ("WPF") on a Microsoft® Windows® platform. In that prototype: (a) Microsoft® Visual Studio® 2008 was used as a main development tool, (b) Mathworks® Matlab® was used to design and evaluate computer vision based techniques used in the software program, and (c) the major APIs and Libraries comprise OpenCV, DirectShow®, Touchless, ARToolkit and S1 Unistroke Recognizer.

In exemplary implementations of this invention, the vision engine processes the video stream captured by the camera. Using computer vision based techniques, the vision engine performs gesture and object recognition. In order to recognize user's hand gesture, the vision engine relies upon color tracking to track the color markers placed on the user's fingers in the captured video stream. This tracking information is used to identify a particular gesture.

In exemplary implementations of this invention, the interface engine generates visual content that is projected by the projector. It also connects to the Internet to find out relevant information for the particular application the user has selected. It also provides the graphical interface on the basis of the input from the vision engine.

Figure 26:
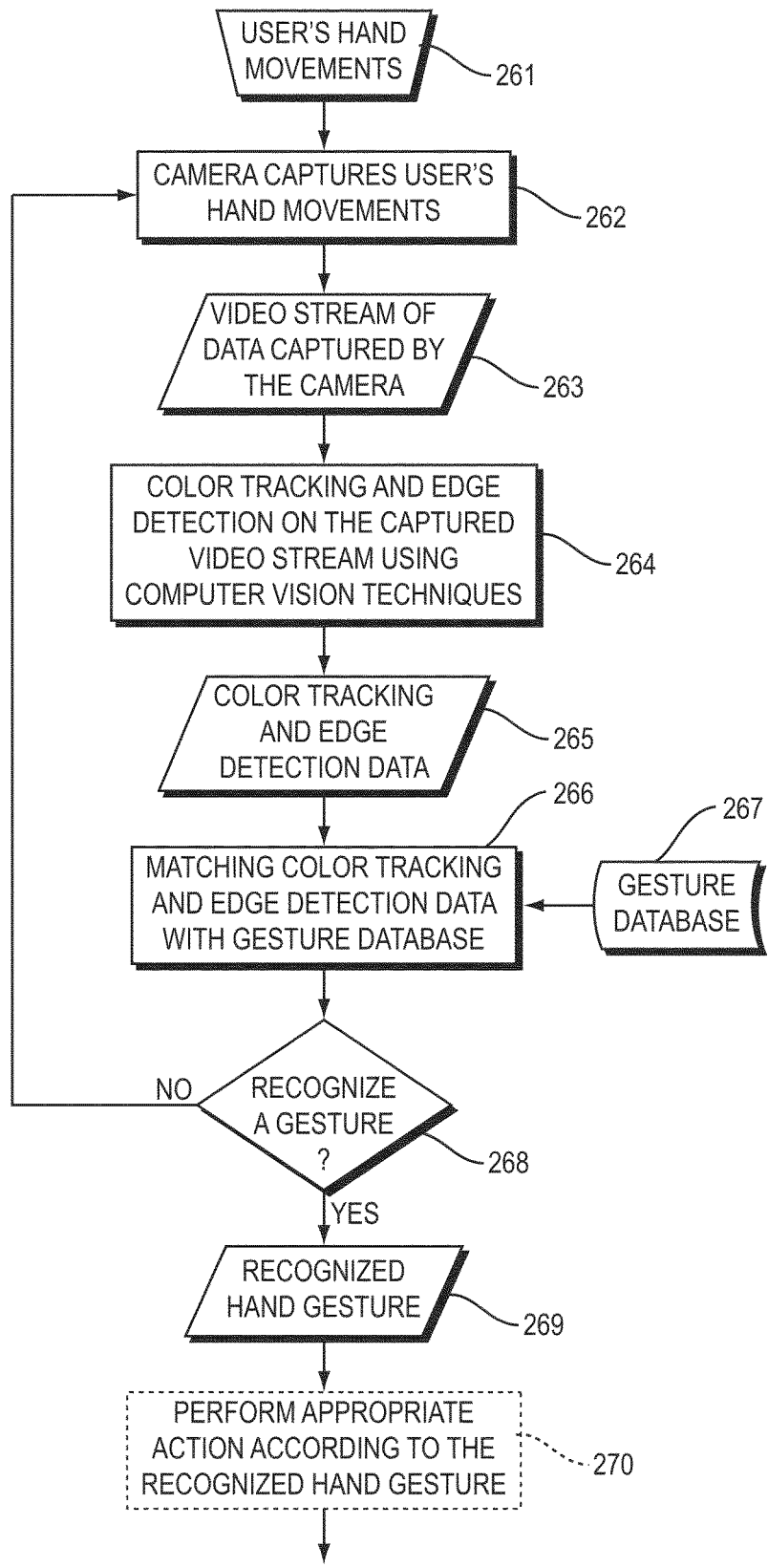
FIG. 26 is a flow chart that describes gesture recognition, in an exemplary implementation of this invention.

FIG. 26 is a flow chart that describes gesture recognition, in an exemplary implementation of this invention. The algorithm presented in the flowchart can be explained as follows: A user's hand movements are captured by the camera. The video stream of data captured by the camera is passed to the software program. The vision engine of the software program processes the video stream of data using computer vision techniques. In particular, the vision engine performs color tracking and edge detection on the captured video data. The colors of the color-markers placed at the user's fingertips are known. The program detects the X and Y positions of the colors by finding the center of the detected color blobs. The program also records the size of the detected color blob along with the location of the color in the frame. This data is continuously recorded. The program then matches the locations and movement patterns of the colors with the pre-stored gesture patterns in gesture database. The gesture database is comprised of a collection of pre-defined and user-generated gestures. If the matching process does not find a successful match; it repeats the explained cycle again. In case a match is found, the corresponding recognized gesture information is passed to the interface engine for further processing.

Thus, as shown in FIG. 26, a user makes hand movements 261. A camera captures the user's hand movements 262 in a video stream of data 263. The vision engine performs color tracking and edge detection analysis on the captured video stream using computer vision techniques 264. The analysis generates color tracking and edge detection data 265 that is matched 266 with a gesture database 267. If a match is found (i.e., a gesture is recognized) 268, then the recognized hand gesture 269 triggers the computer to output instructions to perform appropriate action according to the recognized hand gesture 270. If a match is not found, the cycle repeats again.

Figure 27:
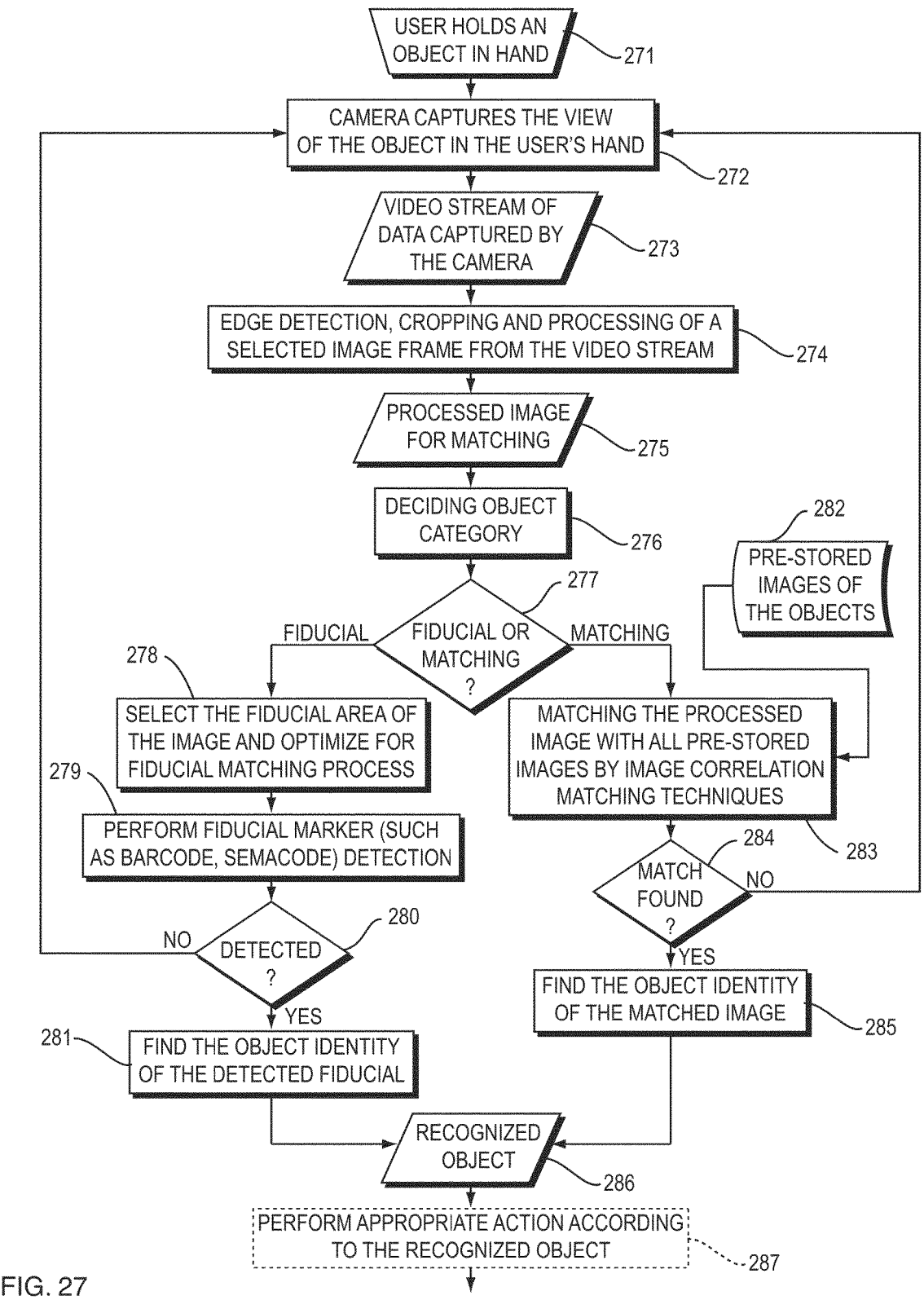
FIG. 27 is a flow chart that describes object recognition, in an exemplary implementation of this invention.

FIG. 27 is a flow chart that describes object recognition, in an exemplary implementation of this invention. The algorithm presented in the flowchart can be explained as below. A user picks up an object (e.g. a book, a product) in his hand. The view of the object in the user's hand is captured by the camera. The video stream of data captured by the camera is passed to the software program. The vision engine of the software program processes the video stream of data using computer vision techniques. In particular, the vision engine performs edge detection on the captured video data. The vision engine crops the image such that the view other than object is minimal. The program determines the category of the object on basis of the geometrical features (shape, size) of the object. The program further processes the image to be matched against the pre-stored images of the same category of objects. If the program recognizes the existence of a fiducial marker (e.g. barcode), it passes the image to a fiducial marker based recognition unit. Else, the image is passed to a matching based recognition unit. In the fiducial marker based recognition step, the image is cropped and marker detection is performed. If the code is been successfully detected, the program finds the identity of the object using Internet. In case of failure the program discards image. In the matching based recognition step, the image is matched with pre-stored images of the same category of objects. This steps uses Speeded Up Robust Features (SURF) and Scale Invariant Feature Transform (SIFT)-based computer vision techniques to perform feature matching. For optimization, the image is divided into smaller units and the matching process is performed using parallel matching units. If the matching process does not find a successful match, the image is discarded. In case a match is found, the corresponding recognized object identity information is passed to the interface engine for further processing.

As shown in FIG. 27, a user holds an object in his or her hand 271. A camera captures a view of the object in the user's hand 272 and generates a video stream of this captured data 273. The vision engine performs edge detection, cropping and processing of selected image frames from the video stream 274, generating a processed image for matching 275. The vision engine categorizes the object 276, based on geometrical features of the object. The vision engine determines whether recognition will be done by fiducial detection or by image matching 277. If fiducial detection will be employed, the visual engine selects the fiducial area of the image and optimizes the image for a fiducial matching process 278, and then performs the fiducial marker detection 279. This may involve detecting fiducials such as barcodes and semacodes. If a fiducial marker is detected 280, then the vision engine may find the object identity of the detected fiducial 281. If image matching will be employed, the vision engine may use image correlation matching techniques 283 to match the processed image with pre-stored images of objects 282. If an image match is found 284, the vision engine finds the object identity of the matched image 285. In either case (fiducial or image matching), if a successful match is not found, the image is discarded and the cycle is repeated again. Once an object is recognized 286 (by fiducial detection or image matching), the computer may output instructions to perform appropriate action according to the recognized object 287.

Figure 28:
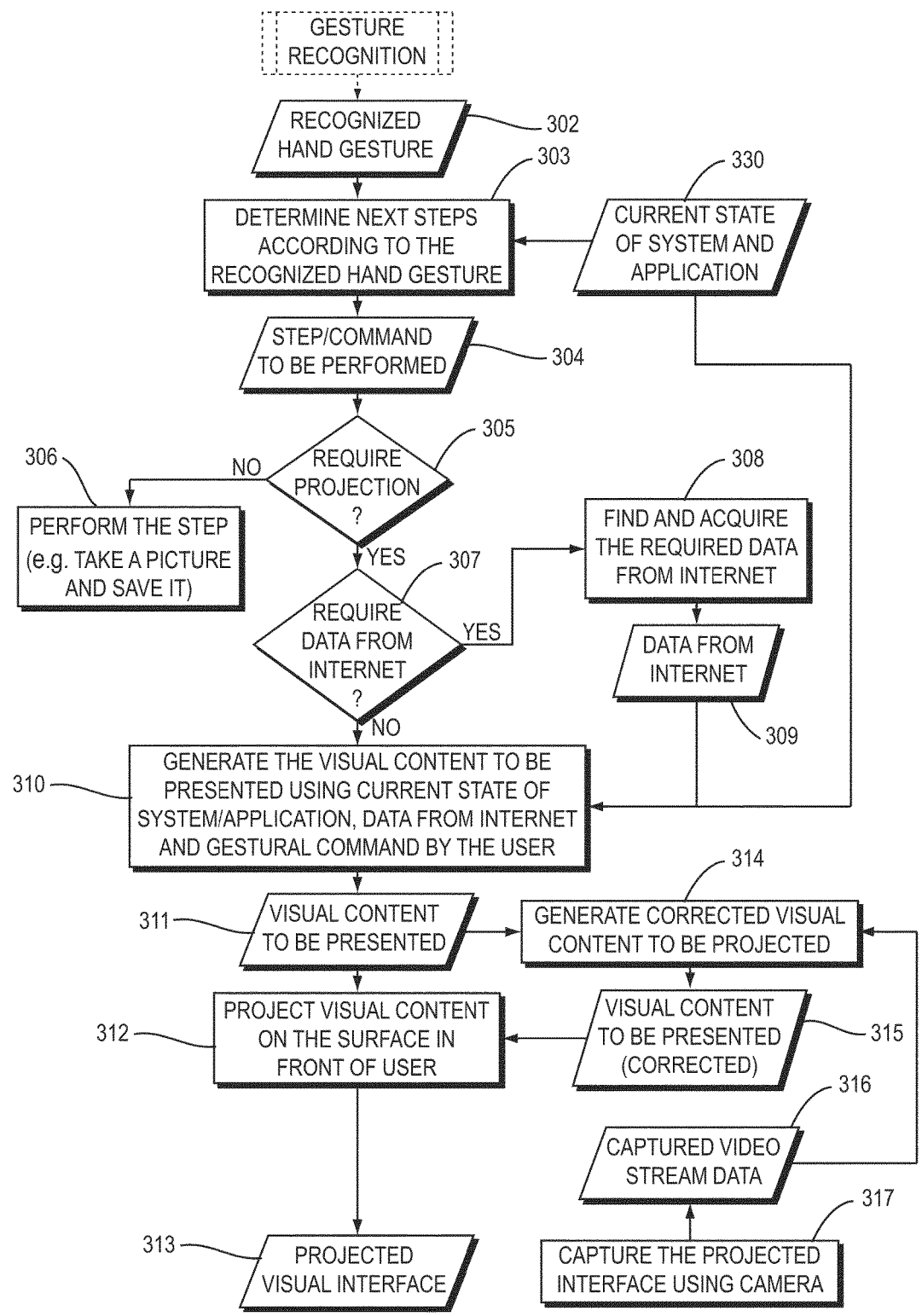
FIG. 28 is a flow chart that describes augmenting a surface, in an exemplary implementation of this invention.

FIG. 28 is a flow chart that describes augmenting a surface, in an exemplary implementation of this invention. This feature projects visual information on a surface and lets the user interact with the projected visual interface. The algorithm presented in the flowchart can be explained as below. Gesture recognition (as explained earlier) provides the interface engine with a recognized hand gesture. The interface engine determines the step to be performed according to the current state of the system and the application the user is interacting with. If the step requires projection, the information about the step/command is passed for further processing. In cases where projection is not required, the system performs the related task. In cases where projection is required and execution of the step or command requires new information from the Internet, the interface engine connects to Internet and acquires the information. The interface engine generates the visual content to be presented using the current state of system, the application the use is interacting with and data from the Internet related to the gestural command. The projector projects the visual interface on the surface in front of the user. The camera captures the projected interface and passes the captured video stream of data to the vision engine. The vision engine provides the interface engine with the required corrections in alignment, tilt, position, scale. The interface engine generates corrected visual content based on this information. The projector projects the corrected visual interface on the surface. The camera again captures the projected interface and this loop of self-correcting projection helps the projector project the visual interface in a proper way.

As shown in FIG. 28, the vision engine may recognize hand gestures 302. The interface engine may then determine the next step or command to be performed, based on this recognized hand gesture 303 and the current state of the system and the application 330. The interface engine may determine whether this step or command to be performed 304 requires projection 305. If it does not, the interface engine may output instructions to perform the step (e.g. take a picture and save it). 306. If the next step or command requires projection, the interface engine may determine whether information is needed from the Internet 307. If it is, the interface engine may output instructions to find and acquire the required data from the Internet 308. The interface engine may generate the visual content to be presented, based on the current state of the system/application, data obtained from the Internet (if any), and gestural commands by the user (if any) 310. Once this visual content is prepared 311, the projector may project it on a surface in front of the user 312, creating a projected visual interface 313 with which the user may interact. The projected image may be calibrated, as follows: The camera may capture the projected interface 317. The captured video stream 316 of the projected interface may be analyzed, in order to generate 314 corrected visual content to be projected 315. This corrected content 315 may then be projected on a surface in front of the user. 312

Figure 29:
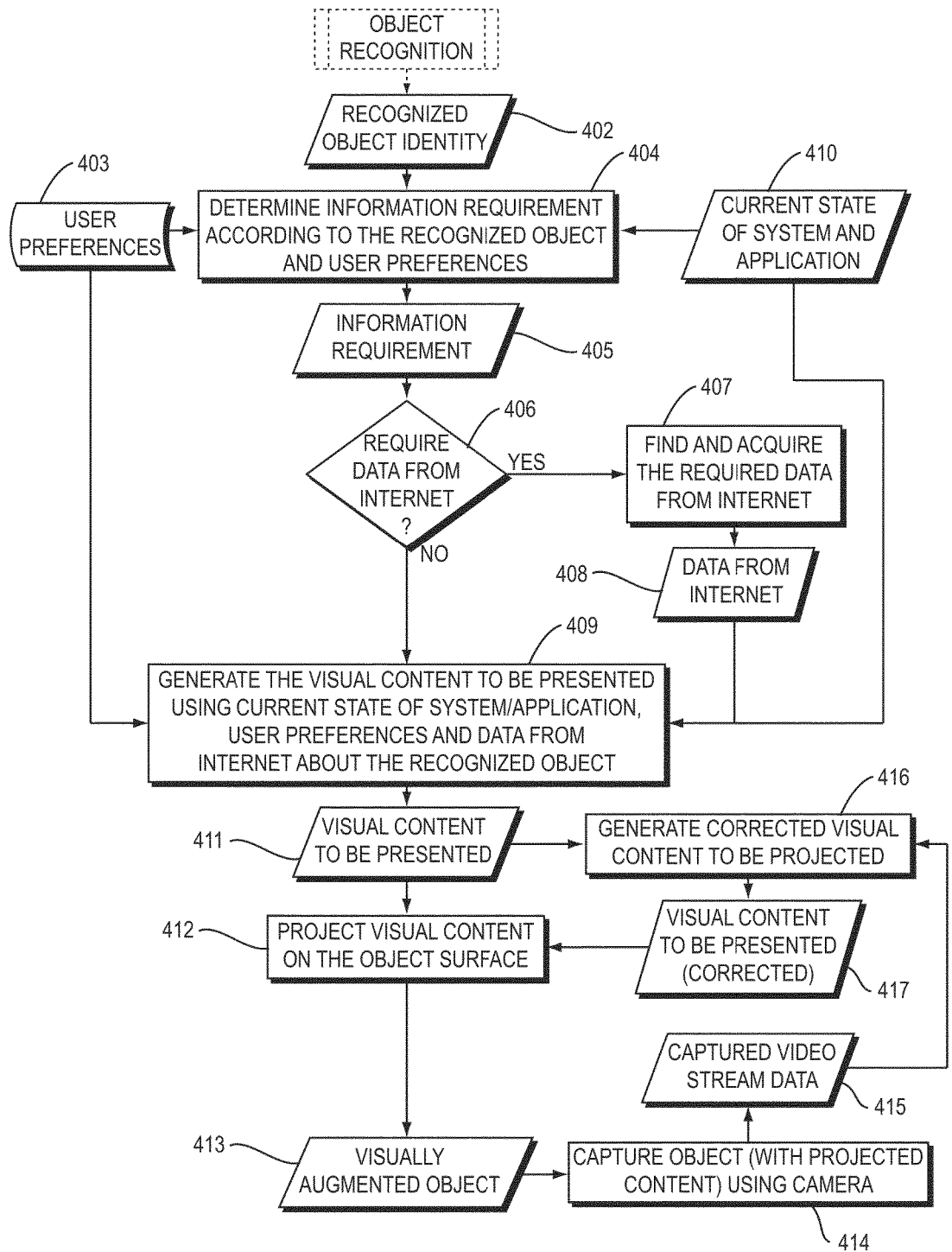
FIG. 29 is a flow chart that describes object augmentation, in an exemplary implementation of this invention.

FIG. 29 is a flow chart that describes object augmentation, in an exemplary implementation of this invention. This feature projects visual information on object the user is interacting with. The algorithm presented in the flowchart can be explained as follows: The object recognition step described earlier provides the interface engine with identity of the recognized object. The interface engine determines the information requirement according to the current state of the system, the application the user is interacting with and the user preferences. (A user sets his preferences based upon his likings). User preferences allow the computer to determine which type of the information user is interested in. After determining the type of information and exact information requirement, the interface engine finds and acquires the required information. In cases where information from the Internet is required, the interface engine also connects to the Internet. The interface engine generates the visual content to be presented using the current state of system, the application the use is interacting with, user preferences and data from internet related to the object. The projector projects the visual information on the object with which the user is interacting. The camera captures the object and the projected visual information and passes the captured video stream of data to the vision engine. The vision engine provides the interface engine with the required corrections in alignment, tilt, position, scale. The interface engine generates corrected visual content on based of this information. The projector projects the corrected visual information on the surface. The camera again captures the projected interface and this loop of self-correcting projection helps the system to project the visual information on the object in a proper way.

As shown in FIG. 29, an object is recognized. The vision engine determines what information is required for augmentation 404, according to the identity of the recognized object 402, user preferences 403 and current state of the system and application 410. After determining what information is required 405, the interface engine determines whether information is needed from the Internet 406. If it is, the interface engine outputs instructions to find and acquire the required data from the Internet 407. The interface engine generates the visual content to be presented 409, using the current state of the system/application, user preferences and data acquired from the Internet 408 (if any). The projector projects 412 this visual content 411 on the surface of an object 412, causing the object to be visually augmented 413. The augmentation may be calibrated, as follows: The camera may capture the visually augmented object, including the content projected on it. This captured video stream 415 may be used to generate corrected visual content to be projected 416. This corrected content 417 may projected on an object's surface 412.

Figure 30:
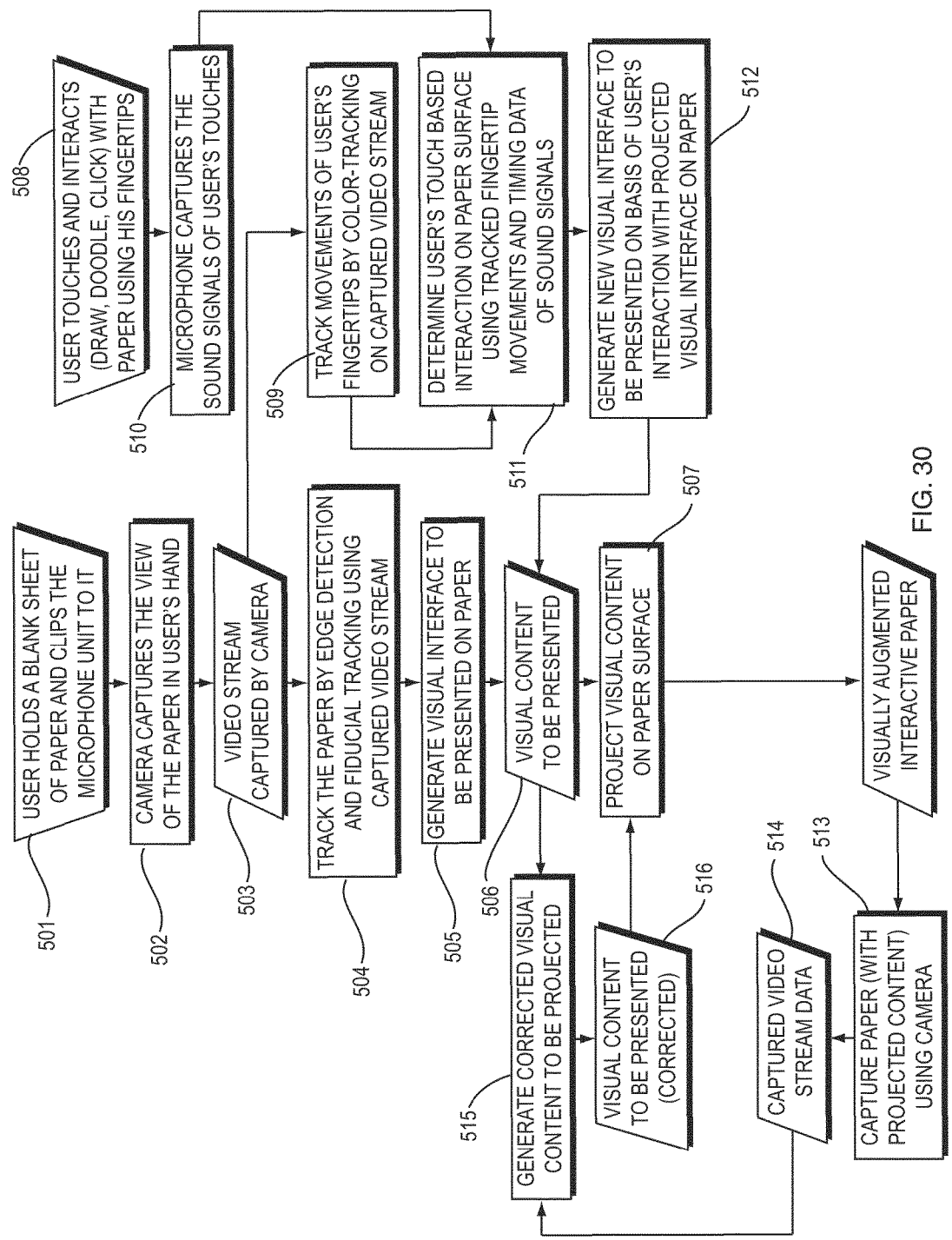
FIG. 30 is a flow chart that describes touch-based interaction, in an exemplary implementation of this invention.

FIG. 30 is a flow chart that describes touch-based interaction using a sheet of paper, in an exemplary implementation of this invention. In this scenario, visual information is projected on a sheet of paper and the user may interact with the projected visual interface using touch based gestures. The algorithm presented in the flowchart can be explained as follows: The user holds a blank sheet of paper and clips a microphone unit to it. The view of the paper in the user's hand is captured by the camera. The video stream of data captured by the camera is passed to the vision engine. The vision engine of the software program processes the video stream of data using computer vision techniques. In particular, the vision engine performs edge detection and fiducial tracking on the captured video data. The edge detection provides the system with the area of paper where the visual interface will be presented. The interface engine generates the visual interface. The projector projects the visual information on the surface of the paper. The user interacts with the projected visual interface by touching the surface of the paper. The microphone captures the sound of the touches. The computer processes the sound signals captured by the microphone and determines the timing of the touch events corresponding to the touches. When the user touches the surface of the paper it generates a sound that is captured by the microphone (as it is tightly clipped to the paper surface). In parallel, the vision engine tracks the movement of the user's fingertips by processing the video stream data captured by the camera. The system determines the user's touch-based interactions on the paper surface using the timing of the touch events and the tracking of the fingertip movements. The interface engine processes this touch based interactions and updates the visual interface. The projector projects the new visual interface on the surface of the paper. The camera captures the paper and the projected visual interface; and passes the captured video stream of data to the vision engine. The vision engine provides the interface engine with the required corrections in alignment, tilt, position, scale. The interface engine generates corrected visual content on based of this information. The projector projects the corrected visual interface. The camera again captures the projected interface and this loop of self-correcting projection helps the system to project the visual information on the paper in a proper way.

As shown in FIG. 30, a user holds a blank sheet of paper and clips a microphone to it 501. The user touches and interacts (e.g., draws, doodles, "clicks") with a projected graphical interface on the paper using his fingertips 508. The microphone captures the sound signals of the user's touch 510. A camera captures a view of the paper in the user's hand 502. The video stream captured by the camera 503 is analyzed by the vision engine to track movements of the user's fingertips, using color-tracking 509. (To facilitate this color-tracking, the user may wear colored markers on his index fingers and thumbs). The computer determines the user's touch-based interaction on the paper surface, using tracked fingertip movements and timing data of sound signals 511.

As shown in FIG. 30, the video stream captured by the camera 503 is also analyzed by the vision engine to track the paper, using edge detection and fiducial tracking 504. The interface engine generates 505 the visual content (which may be a visual interface) 506 to be projected. The projector projects this visual content on the paper's surface 507.

As shown in FIG. 30, the interface engine may generate a new visual interface to be presented, based on the user's touch-based interaction with the projected visual interface on the paper 512. That is, the user may modify the visual interface by making touch-based gestures.

FIG. 30 also depicts how the projected visual interface may be recalibrated: The video camera may capture the paper, with visual content projected on it 513. The resulting captured video stream 514 may be used to generate 515 corrected visual content to be projected 516. This corrected data may be projected on the paper surface 507.

The Source Code, which is incorporated by reference herein, comprises source code employed in a prototype of this invention.

In exemplary implementations of this invention, the computer, projector, camera and other onboard electronics are powered by rechargeable batteries.

A key benefit of this invention is that it may be adapted to be worn by the user. The low weight of the components of this invention makes this practicable.

This invention may be implemented in many other ways, in addition to the particular embodiments described above. Here are a few examples, out of many, of alternative ways to implement this invention:

Different types of projectors may be used. For example, other LCOS projectors may be used, rather than the particular LCOS pico projector model discussed above. Alternately, the projector may have Digital Light Processing® (DLP™) chipsets, instead of LCOS chips. Or, for example, a laser projector may be employed.

Other types of cameras may be used, rather than the Quickcam® Pro for Notebooks™ camera discussed above. For example, a stereo camera or a depth sensing camera may be used instead. One example of such a depth-sensing camera is the time-of-flight depth sensing ZCam® camera made by 3DV Systems (Israel). Alternately, a pair of two cameras (one of which is a visible light camera and one of which is an infra-red camera) may be used.

In a prototype implementation of this invention, color tracking and color markers on the fingers are used for gesture recognition. However, gesture recognition may be done without color tracking or color markers by using, for example, a depth-sensing camera.

A microphone may be omitted. In that case, touch gestures may be tracked using only video data captured by a camera. For example, the distance of a finger from a surface may be determined from the distortion of the projected image on the finger. Or, for example, such distance may be determined from the shadow cast by the finger on the surface. (These visual approaches to determining the distance of a finger from a surface may also be used in conjunction with a microphone).

A second surface mirror may be used rather than a first surface mirror. A mirror may be adjusted by a motor-driven mechanism, rather than manually. Instead of using a single mirror, the direction of light may be adjusted by a plurality of mirrors or by refraction. Also, this invention may be implemented without a mirror or other means of changing the direction of light once it has been projected.

Some or all of the processing may be done by remote computers, rather than onboard. For example, some of the image recognition processing or gesture recognition processing may be done by at least one remote computer that is linked to an onboard computer by the Internet.

Other types of microphones may be used.

Instead of using a wired connection, an onboard computer may be wirelessly connected to one or more other onboard components, such as any onboard camera, projector or microphone. For example, Bluetooth wireless connections may be used to connect an onboard computer with an onboard projector and an onboard camera.

An onboard computer may connected to the Internet by wire or wirelessly. In a prototype of this invention, the computer uses a 3G wireless connection to access the Internet. However, this invention may be implemented with any type of wireless connection, such as 4G, 3GPP Long Term Evolution (LTE), LTE Advanced, WiFi®, WiMAX (based on the IEEE 802.16 standard), CDMA, Bluetooth, GSM (Global System for Mobile Communications), EDGE (Enhanced Data Rates for GSM Evolution), UMTS (Universal Mobile Telecommunications System), HSDPA (High-Speed Downlink Packet Access), or HSUPA (High-Speed Uplink Packet Access). Likewise, this invention may be implemented with a wired, indirect connection (such as Ethernet) between the computer and the Internet.

This invention may also be implemented without gesture recognition. For example, this invention may be implemented in such a manner that it recognizes (and projects information on) objects, but does not recognize gestures.

Also, this invention may be implemented in such a manner that the projector, camera, computer and other components are all housed together in a single integrated unit. For example, they may all be housed in a mobile phone.

The housing or form factor used in this invention may vary. For example, the projector and camera may be housed in a cellphone, smartphone, pendant-like unit, brooch-like object, hat or other headcovering.

This invention may be implemented in such a manner as to facilitate remote collaboration. For example, Person A wears apparatus comprising a camera, projector and computer. Person B uses a computer or cellphone and sees what Person A's camera sees and uses an input device (e.g. stylus or mouse) to overlay information on top of that image. That information then gets projected by the projector worn by person A. For example, a service technician could use this remote collaboration to visually show a consumer which screw to unscrew in order to fix a machine in front of the consumer. This remote video collaboration may be supplemented with a phone link, allowing Person A and Person B to talk to each other.

While exemplary implementations are disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. Apparatus comprising:
    (a) a camera;
    (b) a projector for projecting images on a surface, which surface is separate from the apparatus and is not dedicated to electronic visual display;
    (c) a transceiver for connecting to a global network; and
    (d) a digital computer for
        (i) performing analysis of visual data captured by the camera (A) to identify a solid object or a feature of the solid object, neither the object nor the feature being an image projected by the projector, and (B) to recognize a gesture made by a human in the air while the human is neither in physical contact with, nor holding an object that is in physical contact with, a solid surface, and
        (ii) based at least in part on the analysis:
            outputting instructions to obtain, from the global network, information about the object or feature;
            receiving and processing data indicative of the information, and
            outputting instructions to make changes to the images, in a way that the changes depend at least in part on the information and the gesture;
    wherein
        (A) the global network comprises the Internet, the World-Wide Web, or any other global system of interconnected computer networks, and
        (B) the apparatus is wearable in a manner in which weight of the apparatus is not supported by a human user's hands.

2. Apparatus as set forth in claim 1, wherein the projector is adapted for projecting images which convey the information.

3. Apparatus as set forth in claim 1, wherein the computer is adapted for outputting signals indicative of audio output of a transducer, in such a way that the transducer outputs sound that conveys the information audibly to a user.

4. Apparatus as set forth in claim 1, wherein:
    (a) the feature is the surface of a product or of the product's packaging;
    (b) the information is about the product; and
    (c) the projector is adapted for projecting, on the surface, images that convey the information.

5. Apparatus as set forth in claim 1, wherein:
    (a) the feature comprises text or a graphical pattern, which text or graphical patttern is not an image projected by the projector, and which text or graphical pattern has a subject;
    (b) the information is about the subject; and
    (c) the projector is adapted for projecting, on the surface, images that convey the information.

6. Apparatus as set forth in claim 1, wherein the computer is adapted for analyzing the visual data to identify a specific person, and further adapted for outputting instructions for altering audio or visual output of a transducer in such a way as to convey the information, and the information is about the specific person.

7. Apparatus as set forth in claim 1, wherein the computer is adapted for outputting instructions to project an image of a graphical user interface, and further adapted for analyzing the visual data captured by the camera to detect movements comprising a user's interaction with the projected image of the graphical user interface, wherein the graphical user interface displays a plurality of graphical icons or other visual symbols, each of which represent a different input that may be selected by a gesture made by the user.

8. Apparatus as set forth in claim 1, wherein the computer is adapted for outputting instructions to project images that display an email message obtained through the global network.

9. Apparatus comprising:
(a) a projector for projecting images on at least one surface, which surface is not part of the apparatus or any other electronic visual display device; and
(b) a camera for
  (i) capturing visual data, and
  (ii) outputting signals indicative of the visual data, for transmission to one or more digital processors adapted for (A) analyzing the visual data captured by the camera to recognize a gesture made by a human in the air while the human is neither touching, nor holding an object that touches, a solid surface, and (B) outputting instructions to change the projected images, in such a way as to alter the projected images in response to the gesture;
wherein the apparatus is wearable by a person in a manner in which weight of the apparatus is not supported by the person's hands.

10. Apparatus as set forth in claim 9, wherein at least one said digital processor is adapted for
  outputting, in response to the gesture, instructions to project unto the surface a visual pattern captured by the camera, which visual pattern is on a different surface when captured by the camera, which different surface is not part of an electronic visual display device.

11. Apparatus as set forth in claim 9, wherein at least one said-digital processor is adapted for outputting, in response to the gesture, instructions for the camera to take a photograph.

12. Apparatus as set forth in claim 9, wherein at least one said digital processor is adapted for outputting, in response to the gesture, instructions to project, on the user, an image of a timepiece.

13. Apparatus as set forth in claim 9, wherein at least one said digital processor is adapted for analyzing said visual data to detect changes in position of a body part of a user or of an object held by or affixed to the user, and further adapted for outputting instructions to alter the projected images in response to the changes in position.

14. Apparatus as set forth in claim 9, wherein at least one said digital processor is adapted for analyzing the visual data to recognize a tangible object and for outputting instructions to project on the object information about the object.

* * * * *